(12) United States Patent
Cunningham

(10) Patent No.: US 11,658,695 B2
(45) Date of Patent: *May 23, 2023

(54) DEVICE AND METHOD OF VERIFYING PROTECTIVE CASE USAGE

(71) Applicant: CaseFax Inc., Roseville, CA (US)

(72) Inventor: Randy Mark Cunningham, Roseville, CA (US)

(73) Assignee: CASEFAX INC., Roseville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,554

(22) Filed: Mar. 8, 2021

(65) Prior Publication Data

US 2021/0258032 A1     Aug. 19, 2021

Related U.S. Application Data

(63) Continuation of application No. 15/930,322, filed on May 12, 2020, now Pat. No. 11,108,422, which is a
(Continued)

(51) Int. Cl.
*H04B 1/3888* (2015.01)
*H04B 1/40* (2015.01)
(Continued)

(52) U.S. Cl.
CPC ........ *H04B 1/3888* (2013.01); *G01M 5/0066* (2013.01); *G06F 1/1626* (2013.01);
(Continued)

(58) Field of Classification Search
None
See application file for complete search history.

(56) References Cited

U.S. PATENT DOCUMENTS

| 2009/0051509 A1 | 2/2009 | Hwang |
| 2009/0312075 A1 | 12/2009 | Kimbrell |

(Continued)

FOREIGN PATENT DOCUMENTS

| CN | 1496900 A | * | 5/2004 | ............ B60R 21/36 |
| EP | 2267579 A1 | * | 12/2010 | .......... G01P 15/0891 |

(Continued)

OTHER PUBLICATIONS

PCT Notification of Transmittal of The International Search Report and The Written Opinion of the International Searching Authority, or The Declaration for PCT Counterpart Application No. PCT/US2018/066306 Containing International Search Report, 13 pgs. (dated Mar. 29, 2019).

*Primary Examiner* — Mohammed Rachedine
(74) *Attorney, Agent, or Firm* — Womble Bond Dickinson (US) LLP

(57) ABSTRACT

A device and method of verifying protective case usage, is described. The device includes one or more processors to drive an electromechanical transducer with an input signal. The electromechanical transducer generates an input force based on the input signal, and a sensor of the device generates a test output signal in response to the input force. The one or more processors determine, based on the test output signal, a level of verification that a protective case is mounted on the device. The determination can include determining whether the test output signal matches a predetermined impulse response signal indicative of an unprotected device or a protected device. A digital identification tag of the protective case can be read by a radio-frequency transceiver of the device to provide an additional level of verification that the protective case is mounted on the device. Other aspects are described and claimed.

20 Claims, 9 Drawing Sheets

Related U.S. Application Data continuation of application No. 16/459,128, filed on Jul. 1, 2019, now Pat. No. 10,693,518, which is a continuation of application No. 16/224,415, filed on Dec. 18, 2018, now Pat. No. 10,374,649.

(60) Provisional application No. 62/738,488, filed on Sep. 28, 2018, provisional application No. 62/609,255, filed on Dec. 21, 2017.

(51) Int. Cl.
| | |
|---|---|
| *H04M 1/24* | (2006.01) |
| *H04M 1/18* | (2006.01) |
| *G01M 5/00* | (2006.01) |
| *G06F 1/16* | (2006.01) |
| *G06F 3/01* | (2006.01) |
| *G06F 1/26* | (2006.01) |

(52) U.S. Cl.
CPC .......... *G06F 1/1633* (2013.01); *G06F 1/1684* (2013.01); *G06F 1/26* (2013.01); *G06F 3/016* (2013.01); *H04B 1/40* (2013.01); *H04M 1/24* (2013.01); *G06F 2200/1633* (2013.01); *H04M 1/185* (2013.01)

(56) References Cited

U.S. PATENT DOCUMENTS

| | | | |
|---|---|---|---|
| 2010/0045455 A1* | 2/2010 | Mazzolini | G08B 13/14 340/521 |
| 2012/0072167 A1* | 3/2012 | Cretella, Jr. | G05B 15/02 702/150 |
| 2014/0216971 A1 | 8/2014 | Ashley et al. | |
| 2015/0301565 A1* | 10/2015 | Manullang | H04M 1/185 361/679.26 |
| 2015/0311939 A1 | 10/2015 | Zalon et al. | |
| 2016/0036267 A1 | 2/2016 | Yang et al. | |
| 2016/0315652 A1* | 10/2016 | Tabatabai | H04M 1/03 |
| 2017/0048937 A1* | 2/2017 | Wang | H02J 50/10 |
| 2017/0126267 A1* | 5/2017 | Park | H04B 1/3888 |
| 2017/0345237 A1* | 11/2017 | Kuenzi | H04W 12/35 |
| 2017/0364154 A1* | 12/2017 | Levesque | G06F 1/1637 |

FOREIGN PATENT DOCUMENTS

| | | | | |
|---|---|---|---|---|
| EP | 2 658 221 A1 | 10/2013 | | |
| WO | 2008/060636 A2 | 5/2008 | | |
| WO | 2008/060636 A3 | 5/2008 | | |
| WO | WO-2009026951 A1 * | 3/2009 | ......... | A63B 69/3617 |
| WO | 2014/080545 A1 | 5/2014 | | |
| WO | WO-2018165693 A1 * | 9/2018 | ........... | A61B 5/0022 |

\* cited by examiner

Protective Case Verification Report

Report Date: 6/2/2017 — 1000

Protective Case: Brand K - Model: Super Pro Case
Highest Supported Verification Level: Level 2 - Branded Case Verification Smartphone: Orange Smartphone 7
Smartphone Model: KXM698VK19
Smartphone Serial Number: DNPK1MXPD70081

REPORT TIMEFRAME
START DATE: January 5, 2017
END DATE: May 30, 2017

PCV Test Results

| Verification Levels | Test Count | PASS | FAIL | PCV % |
|---|---|---|---|---|
| Level 1 - Generic Case | 145 | 142 | 3 | 97.9 |
| Level 2 - Branded Case | 145 | 144 | 1 | 99.3 |
| Level 3 - Digital ID Tag | ------- not supported ------- | | | |

Highest Supported Verification - Level 2: PCV %: 99.3 — 1004

URL to on-line copy of this PCV Test Report: https://www.report.com/ZXWK3992875ak67 — 1002

FIG. 10

DEVICE AND METHOD OF VERIFYING PROTECTIVE CASE USAGE

This application is a continuation of U.S. application Ser. No. 15/930,322, filed on May 12, 2020, which is a continuation of U.S. application Ser. No. 16/459,128, filed on Jul. 1, 2019, now issued as U.S. Pat. No. 10,693,518 on Jun. 23, 2020, which is a continuation of U.S. application Ser. No. 16/224,415, filed on Dec. 18, 2018, now issued as U.S. Pat. No. 10,374,649 on Aug. 6, 2019, which claims the benefit of priority of U.S. Provisional Patent Application No. 62/738,488, filed on Sep. 28, 2018, and U.S. Provisional Patent Application No. 62/609,255, filed on Dec. 21, 2017, and those patent applications are incorporated herein by reference.

BACKGROUND

Field

Aspects related to portable electronic devices are disclosed. More particularly, aspects related to portable electronic devices configured for use with protective cases are disclosed.

Background Information

Mobile devices, such as smartphones, are ubiquitous. Despite their prevalence, however, mobile devices have steadily increased in cost since their inception more than a decade ago. Some smartphones today retail new for over a thousand dollars, and smartphone repair or replacement can cost several hundred dollars.

The high initial and ongoing costs of mobile devices has led many mobile device owners to protect their devices with a protective case. Typically, the cost of a protective case is justified by the concern of possibly damaging the mobile device in the event it is dropped or exposed to a liquid. More particularly, the protective case mitigates the risk of loss resulting from costly repair or replacement of mobile devices that have been damaged by impact or submersion. Statistics show that the concern of damage is warranted: Americans have spent about four billion dollars on smartphone repairs in a single year.

SUMMARY

A mobile device that has been protected against impact or submersion may be more valuable than a counterpart device that has been unprotected against such events. For example, an owner of a smartphone may be able to sell the device at a higher price if the prospective buyer believes that the device was well-cared for and protected. There has not been a way, however, for the buyer to objectively verify that the owner protected the device during prior use. Similarly, companies that issue company-owned tablet computers to employees can protect their investment by requiring the computers to remain within a protective case during use. The company, however, has not been able to objectively verify that the employee followed company policy by keeping the computer in a protective case. Without the ability to objectively verify protective case usage on a device, it may not be possible to differentiate the value of devices having different protection histories, or implement protection policies that will protect the investment of all parties to an equipment use agreement.

A device and a method of verifying protective case usage on the device, is described. The device can determine one or more levels of verification to verify that a protective case is mounted on the device. Furthermore, the device can determine an amount of time that the protective case is mounted on the device, e.g., a percentage of time that the device has been protected since purchase. The device can report the protective case verification data to a remote server, which can track the protection history of the device. The protection history can be valuable information, for example, when an owner of the device decides to sell the device. More particularly, the protection history can be reviewed by a prospective buyer to verify that the device has been protected by the seller, and thus, should be in good condition. Accordingly, the prospective buyer may be more likely to buy the device and/or more likely to buy the device at a higher price. In summary, a device that is configured to verify and track protective case usage can increase the value of the device in the marketplace.

The device can perform a protected case verification (PCV) test to verify protective case usage. The device can include driving an electromechanical transducer, e.g., a vibration motor, inside of the device with an input signal to cause the electromechanical transducer to generate an input force. A sensor, e.g., an accelerometer, inside of the device can detect the input force, and in response, generate a test output signal. One or more processors of the device can receive the test output signal and determine whether a protective case is mounted on the device based on the test output signal. For example, frequency content of the test output signal can define an impulse response of the device responsive to the input force. The test impulse response can be compared to a known impulse response for a standalone device to determine whether the test data matches the reference data. Mismatched data can provide a first level of verification that the device is protected. Similarly, the test impulse response can be compared to a known impulse response for a device-case system to determine whether the test data matches the reference data. Matching data can provide a second level of verification that the device is protected. In an aspect, the protective case can include a communication device, e.g., a digital identification (ID) tag such as a near-field communication (NFC) tag, storing an identifier. The identifier can be unique to the protective case and/or specific to a brand/model of the case. The device can read the digital ID tag to determine whether the identifier matches a reference case identifier. Matching identifiers can provide a third level of verification that the device is protected.

The device can communicate verification information to a remote server for inclusion in a PCV test report. For example, the PCV test report can indicate a highest level of verification achieved, e.g., the first level, the second level, or the third level, and/or a percentage of time that the device was protected. The PCV test report can be relied on by interested parties, e.g., a prospective buyer of the device or a company that has issued the device to an employee, to verify that the device has been used as expected.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 10 is a pictorial view of a protective case verification report documenting protective case usage by a device, in accordance with an aspect.

DETAILED DESCRIPTION

Figure 1:
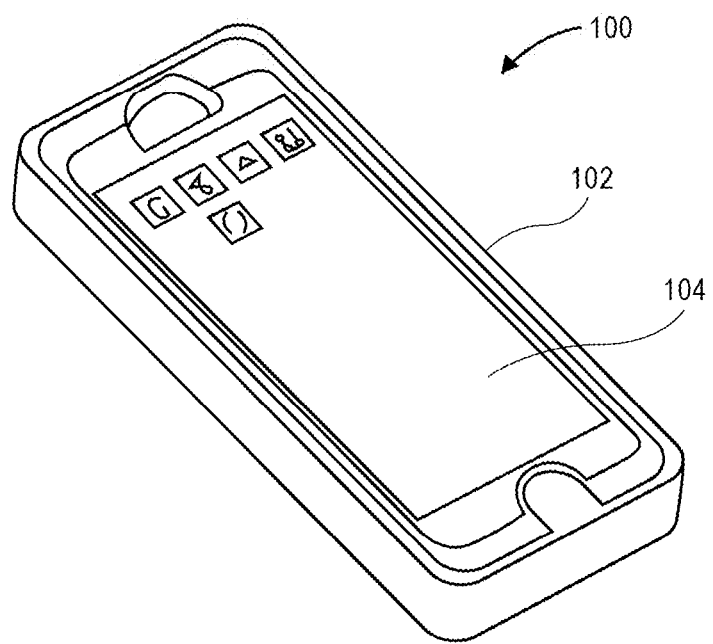
FIG. 1 is a pictorial view of a device-case system, in accordance with an aspect.

Aspects describe a device and a method of verifying protective case usage. The device can be a mobile device, such as a smartphone, and can determine that a protective case is mounted on the device based on an impulse response of the smartphone to a driving force. The device, however, can be another mobile device, such as a tablet computer, a laptop computer, or headphones, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "above" may indicate a first direction away from a reference point. Similarly, "below" may indicate a location in a second direction away from the reference point and opposite to the first direction. Such terms are provided to establish relative frames of reference, however, and are not intended to limit the use or orientation of a device or a protective case to a specific configuration described in the various aspects below.

In an aspect, a device, such as a smartphone, performs a self-test to determine whether a protective case is installed on the device at the time that the test is performed. The device includes one or more processors that can drive an electromechanical transducer of the device to generate an input force. For example, electromechanical transducer can be driven by an input signal to generate a test vibration signal. One or more sensors of the device, e.g., a three-axis accelerometer, can detect the input force and generate a corresponding output signal. The one or more processors can determine, based on the output signal, whether the protective case is mounted on the device. For example, the one or more processors can perform a fast Fourier transform (FFT) algorithm on the output signal to determine a spectral frequency content of the output signal, and compare the spectral frequency content to a predetermined impulse response signal that is indicative of an unprotected device or a protected device. Based on the comparison, the one or more processors can determine whether the device is protected or unprotected. The test results can be reported to and stored by a remote server for future use. For example, the remote server can send notifications to parties interested in knowing whether the device is using, or has used, a protective case.

Referring to FIG. 1, a pictorial view of a device-case system is shown in accordance with an aspect. A device-case system 100 can be a combination of a device and a protective case. For example, device-case system 100 can be a reference protective case 102 mounted on a reference device 104. Reference device can be a smartphone, a tablet computer, or another mobile device. Reference device can be any of numerous brands/models of mobile devices having touchscreens and processors capable of downloading and running mobile software applications. Reference case 102 can be any of numerous brands/models of protective case accessory products that help prevent damage to a mobile device in the event the mobile device is exposed to mechanical shock and/or liquid contact.

Reference device 104 and reference case 102 may have known mechanical characteristics that affect an impulse response of device-case system 100 to an input force. For example, reference case 102 may be formed from particular materials, e.g., plastic or rubber compounds, with a particular size, e.g., shape, thickness, or weight, to protect reference device 104. More particularly, reference case 102 absorbs energy and/or resonates energy in a particular manner when subjected to a vibrational stimulus, and thus, device-case system 100 has a particular impulse response to an input force when reference device 104 is installed in reference case 102.

Figure 2:
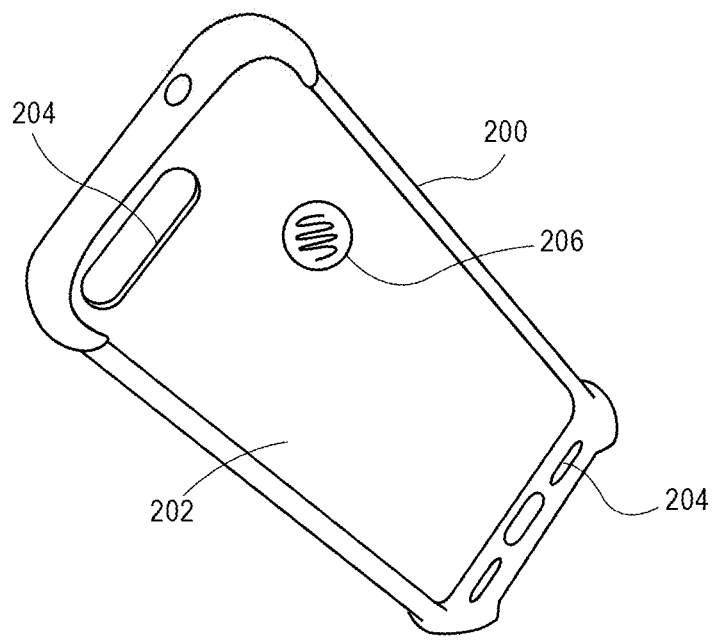
FIG. 2 is a pictorial view of a protective case, in accordance with an aspect.

Referring to FIG. 2, a pictorial view of a protective case is shown in accordance with an aspect. As described above, a protective case 200 can have particular geometrical features conducive to protecting a mobile device when mounted on the mobile device. For example, protective case 200 can include one or more walls 202 or corners formed from respective materials and thickness to absorb mechanical shock when device-case system 100 is dropped by a user. Protective case 200 can have one or more holes 204 to allow for light or sound to pass between the mobile device and a surrounding environment. Protective case 200 can include other features, such as a front cover (not shown) to provide added protection to a display of the mobile device, e.g., by preventing liquid from directly contacting the display when protective case 200 is exposed to water.

In an aspect, protective case 200 includes a digital identification (ID) tag 206. For example, digital ID tag 206 can be attached to an interior of protective case 200. The interior can surround a cavity that receives the mobile device. Digital ID tag 206 can be permanently or semi-permanently affixed to wall 202. Digital ID tag 206 can be a self-adhesive tag. Digital ID tag 206 can be attached to wall 202 using bonding techniques, such as gluing or welding. In an aspect, digital ID tag 206 can be embedded in wall 202 of protective case 200. For example, digital ID tag 206 may be molded, e.g., insert molded, into wall 202 during the manufacture of protective case 200.

Digital ID tag 206 can store information corresponding to protective case 200. For example, digital ID tag 206 can store an identifier of protective case 200. In an aspect, digital ID tag 206 is a passive tag, e.g., a passive near-field communication (NFC) tag, capable of being programmed with the identifier. The identifier can be an encrypted digital identification code that is assigned to a specific brand or model of protective case 200. Digital ID tag 206 can be programmed with the identifier during manufacture of the particular case, and can be affixed inside the particular case during the manufacture. Digital ID tag 206 may be affixed inside protective case 200 at a location such that a radio frequency (RF) transceiver, e.g., an NFC reader, of the mobile device can read digital ID tag 206 after the mobile device is installed in protective case 200. Alternatively, digital ID tag 206 may be affixed inside protective case 200 at a location where it is not readable by the RF transceiver after installation. In the latter case, the RF transceiver can read the identifier from the digital ID tag 206 during a setup procedure before the mobile device is installed in the protective case 200.

It will be appreciated that, although the digital ID tag 206 of protective case 200 is referred to as being "NFC" tag 206 throughout this description, protective case 200 can include an alternative communication tag. For example, digital ID tag 206 can be a passive radio-frequency identification (RFID) tag operating within a different radio frequency band to store and communicate the identifier to the mobile device. It is noteworthy that NFC operates in a range that is less than a range of RFID. For example, NFC typically works in a range of less than twenty centimeters, whereas RFID typically works in a range of one meter or more. If the mobile device does not support NFC or RFID radio frequency communications, the identifier can be embedded into a Bluetooth (BT) tag. For example, digital ID tag 206 can include an active or passive Bluetooth Low Energy (BTLE) beacon device, which typically works in a range of about thirty meters, or another communication device using another communication protocol. In an aspect, digital ID tag 206 includes a dormant BT tag, as described further with respect to FIG. 12 below. The short range of NFC can allow good communication between an NFC reader contained within the mobile device and NFC tag 206 of protective case 200, which is in direct contact with the mobile device. In an aspect, digital ID tag 206 includes a dormant NFC tag, as described further with respect to FIG. 11 below. Accordingly, it will be appreciated that one embodiment of digital ID tag 206 described below, e.g., an NFC tag, may be substituted for another embodiment of digital ID tag 206, e.g., a BT tag, in the context of the systems and methods described below.

Figure 3:
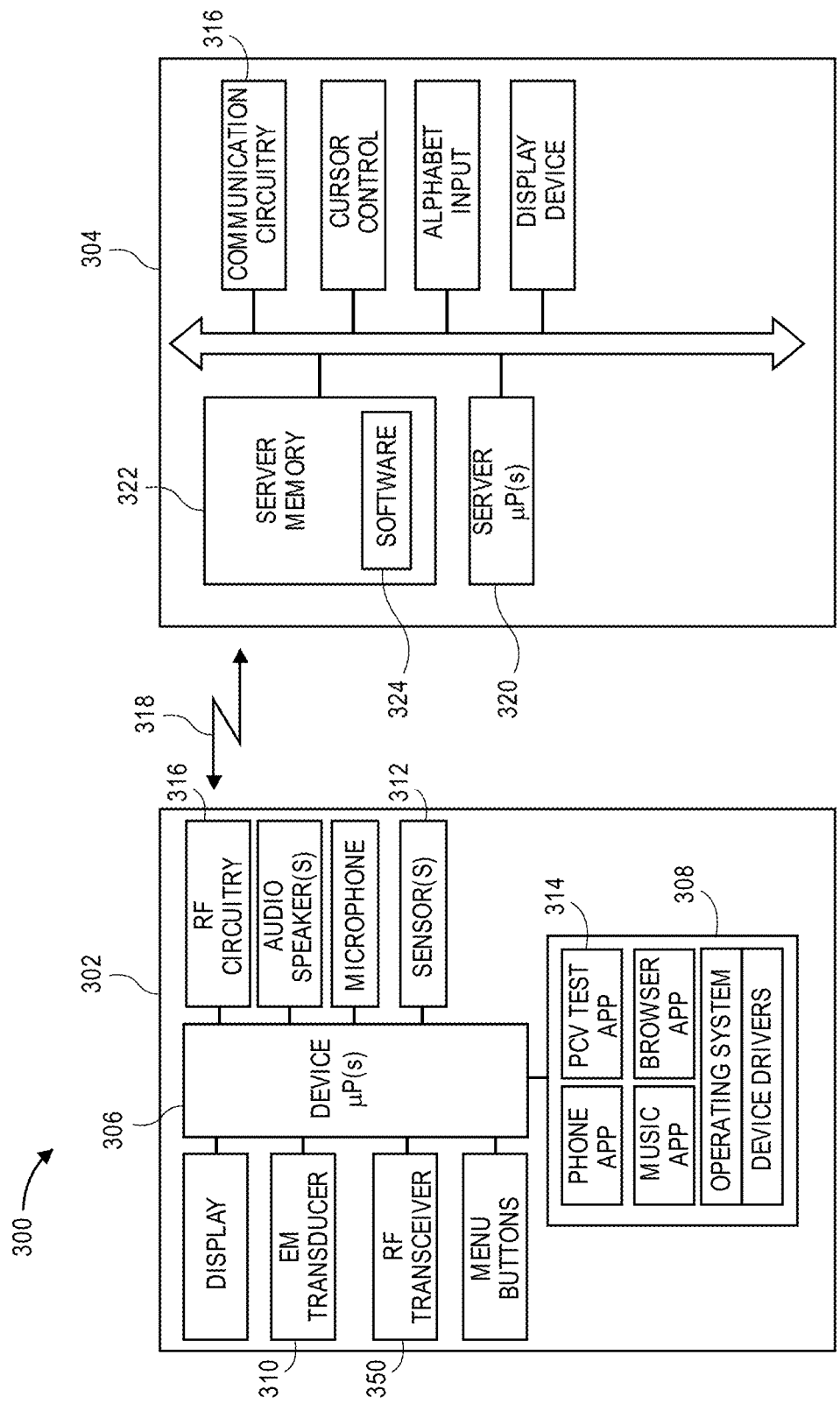
FIG. 3 is a block diagram of a system for verifying protective case usage, in accordance with an aspect.

Referring to FIG. 3, a block diagram of a system for verifying protective case usage is shown in accordance with an aspect. A protective case verification (PCV) system 300 can include a device 302, which can be any of several types of portable devices 302 or apparatuses with circuitry suited to specific functionality. Similarly, PCV system 300 can include a remote server 304, which can be any of several types of computer systems with circuitry suited to specific functionality. Accordingly, the diagrammed circuitry is provided by way of example and not limitation.

Device 302 may include one or more device processors 306 to execute instructions to carry out the different functions and capabilities described below. Instructions executed by device processor(s) 306 may be retrieved from a device memory 308, which may include a non-transitory machine readable medium. The instructions may be in the form of an operating system program having device drivers and/or one or more software applications for performing operations according to the methods described below.

To perform the various functions, device processor(s) 306 may directly or indirectly implement control loops and receive input signals from, and/or provide output signals to, other electronic components. For example, device processor(s) 306 may drive an electromechanical transducer 310 with an input signal to generate an input force. Electromechanical transducer 310 can be an actuator configured to covert the input signal, e.g., an electrical voltage, into motion. For example, electromechanical transducer 310 can be configured to generate a vibration, which applies an input force to device 302. In an aspect, electromechanical transducer 310 is a vibration motor configured to generate a predetermined vibration signal based on variations in the electrical input signal. The vibration motor can have an off-balance weight attached to an end of an electric motor shaft such that activation of the electric motor causes the offset weight to spin and produce mechanical vibration. The mechanical vibration can apply the input force to other components of device 302, such as sensors 312, indirectly via transmission through a housing of device 302, or directly.

Electromechanical transducer 310 may include other types of actuators configured to generate the input force. In an aspect, electromechanical transducer 310 is a haptic vibration engine. The haptic electronic component can be used to create the mechanical vibration. This type of actuator, which is capable of creating the mechanical vibration inside device 302, can be characterized as a type of linear oscillator. The haptic vibration engine receives the input signal from device processor(s) 306. The input signal determines a waveform shape of the mechanical vibration pattern and may include segments of differing frequency, amplitude, and waveform shape.

Device 302 can include one or more sensors 312 configured to generate an output signal (FIG. 7) corresponding to inputs from other device components. For example, as described below, device 302 can include an electromechanical sensor 312 configured to generate a baseline output signal in response to a baseline input signal, or a test output signal in response to a test input signal. The output signal(s) may be generated in response to the input force(s) generated by electromechanical transducer 310. In an aspect, the electromechanical sensor 312 is an accelerometer configured to generate the output signal in response to the predetermined vibration signal. The accelerometer can be a 3-axis micro-electronic accelerometer device fabricated using micro electro-mechanical systems (MEMS) technology. The 3-axis accelerometer can generate the output signal having three components, e.g., acceleration of device 302 and/or the sensor 312 along three principal axes.

The one or more sensors 312 of device 302 can include other types of sensors for detecting movement of device 302 and/or the sensor 312 in response to external forces. For example, the one or more sensors 312 can include a gyroscope to measure an angular rate of change of device 302 by monitoring the Coriolis Effect. The gyroscope can be a 3-axis gyroscope fabricated using MEMS technology. Similarly, device 302 can include a compass (a digital magnetometer) capable of sensing the Hall Effect to measure a magnetic field of the earth. The compass can provide an output signal corresponding to a direction and/or bearing of device 302.

The motion sensors 312 described above can be configured to generate a motion signal corresponding to movement of device 302. Furthermore, device processor(s) 306 can include a motion co-processor designed specifically to monitor, collect, and interpret the motion data from the one or more sensors 312. The motion data can be interpreted and summarized by the motion co-processor, stored in device memory 308 for use in the operations described below, and/or communicated to remote server 304.

In an aspect, device processor(s) 306 can access and retrieve data stored in device memory 308 for various uses. For example, the output signal data from the one or more sensors 312 indicating device and/or sensor movement can be used by one or more application running on device 302. The applications can control phone, music playback, or web browsing functions, by way of example. In an aspect, the applications include a PCV test application 314 that controls a protective case usage verification function. The application programs can run on top of the operating system.

Optionally, device 302 can include an RF transceiver 350. For example, RF transceiver 350 can include an NFC reader 350 (FIG. 11) or a Bluetooth (BT) radio (FIG. 12). NFC reader 350 can include a transceiver controller and a transceiver antenna to effectuate communications between device 302 and protective case 200. For example, transceiver reader 350 can be configured to query digital ID tag 206 for information about protective case 200. In an aspect, RF transceiver 350 is configured to read the identifier of protective case 200 from digital ID tag 206. As described above, NFC tag 206 can be mounted on protective case 200, and can be read by NFC reader 350 before or after installing device 302 in protective case 200.

Device processor(s) 306 can receive input signals from, and output signals to, other device components. For example, device 302 can include microphone transducers to support cellular communication and audio recording functionality. The microphone transducers can be used by phone or PCV test applications on device 302 to record audio data files, which can then be processed by device processor(s) 306. As described below, the microphones can be used as sensors to sense input signals from one or more speakers in an alternative PCV test configuration.

Device processor(s) 306 can receive input signals from menu buttons of device 302, including through input selections of user interface elements displayed on a display. In an aspect, device processor(s) 306 can provide output signals to the speaker(s) of device 302. For example, device 302 can include a left speaker and a right speaker, which may be independently driven by an audio signal generated by device processor(s) 306.

Device 302 and remote server 304 of PCV system 300 can include respective communication circuitry 316 for establishing electronic communication. Communication circuitry 316 of device 302 can include one or more of an NFC radio, a WiFi wireless LAN radio, a Bluetooth wireless radio, a cellular wireless radio, or a GPS radio receiver. For example, device 302 can include RF circuitry 316 to transmit data, such as verification information 318 described below, to remote server 304.

Remote server 304, which may be networked directly with device 302 through wireless communications via RF circuitry or indirectly through a computer network, a telephone network, the Internet, etc., may include one or more server processors 320 to execute instructions to carry out the different functions and capabilities described below. Instructions executed by server processor(s) 320 may be retrieved from a server memory 322, which may include a non-transitory machine readable medium of a data storage device. The instructions may be in the form of an operating system program having device drivers and/or one or more software applications 324 running on remote server 304 for performing operations according to the methods described below. For example, server software 324 can include database applications used for recording verification information 318 provided by device 302. Server software 324 can include PCV report generation software, which can create PCV reports, as described below.

Server processor(s) 320 can receive input signals from, and output signals to, other server components. For example, remote server 304 can include input devices, such as cursor control devices, e.g., a mouse, and alpha-numeric input devices, e.g., a keyboard, to allow a user to interact with data and information displayed on a display device.

Communication circuitry 316 of remote server 304 can include one or more of an NFC radio, a WiFi wireless LAN radio, a Bluetooth wireless radio, a cellular wireless radio, or a GPS radio receiver. Furthermore, communication circuitry 316 can include a network communication interface, such as a network interface controller, to connect remote server 304 to a computer network. Communication circuitry 316 of remote server 304 can be used to transmit data, such as PCV reports, to device 302 or to other connected computing apparatuses within the network.

Figure 4:
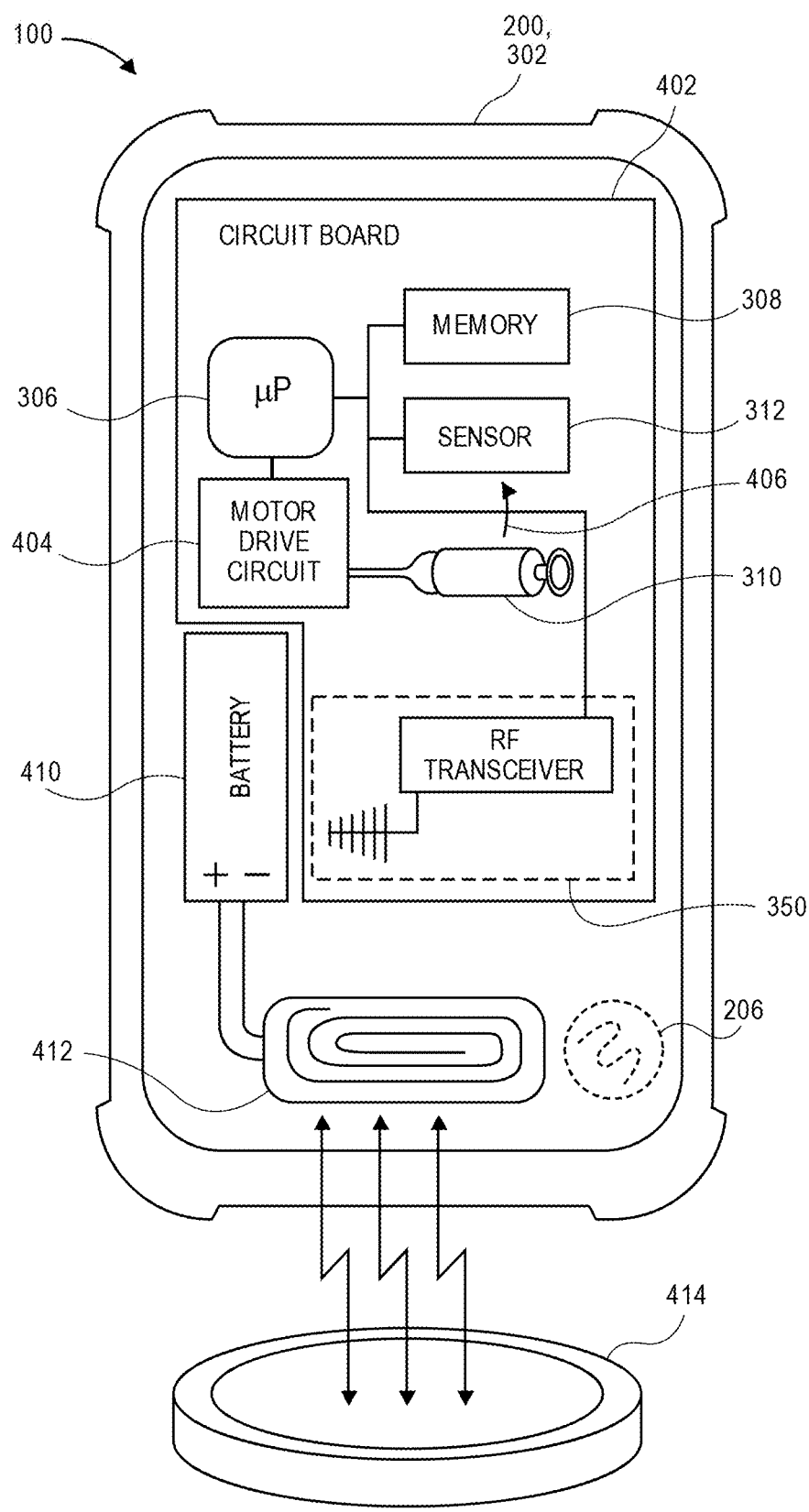
FIG. 4 is a schematic view of a device-case system configured to verify protective case usage, in accordance with an aspect.
Figure 7:
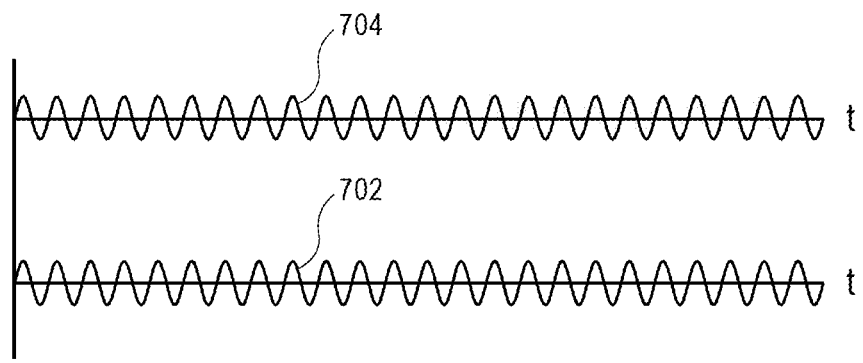
FIG. 7 is a graphical view of a test output signal and a baseline output signal, in accordance with an aspect.

Referring to FIG. 4, a schematic view of a device-case system configured to verify protective case usage is shown in accordance with an aspect. Several components of device-case system 100, which includes device 302 installed in protective case 200, are described above. In an aspect, the device components can be contained within a device housing. More particularly, device 302 may include an internal circuit board 402, which is fastened to the housing in a device interior. Several device components, such as device processor 306, device memory 308, sensor 312, electromechanical transducer 310, and RF transceiver 350, may be mounted on internal circuit board 402. Other circuitry, such as a motor drive circuit 404, can be mounted on internal circuit board 402 and placed in communication with device processor 306. Accordingly, device processor 306 can drive electromechanical transducer 310, using motor drive circuit 404, with an input signal to generate an input force 406 that is mechanically transmitted through internal circuit board 402 and/or the device housing. Input force 406 can be detected by sensor 312, and sensor 312 can generate a corresponding output signal (e.g., a baseline output signal or a test output signal as shown in FIG. 7), which is communicated to device processor 306 and/or device memory 308.

NFC tag 206 can be mounted on wall 202 of protective case 200 to communicate with NFC reader 350. As described above, NFC tag 206 may alternatively be an RFID tag, a BTLE beacon, or another communication device having a longer range than an NFC device, and being capable of being programmed with an encrypted identifier that corresponds to a specific brand/model of protective case 200. After programming the communication device, e.g., a BTLE beacon, with the identifier, the communication device can begin automatically periodically broadcasting the encrypted identifier to the corresponding circuitry of device 302 intended to read the identifier.

Device 302 can be powered by an internal battery 410 contained within the device housing. Battery 410 can be rechargeable. For example, device 302 can include a near-field charging antenna 412 to enable device 302 to support wireless charging of battery 410. Near-field charging antenna 412 can be a loop antenna having a specialized geometry. The loop antenna can interface with a wireless charging plate 414 external to the device housing. The wireless charging plate 414 can be a mobile device accessory that transmits radiofrequency energy capable of recharging battery 410 inside device 302. The radiofrequency energy can induce electrical current within the loop antenna device to recharge battery 410 of a smart phone, a watch, a tablet computer, etc.

Figure 5:
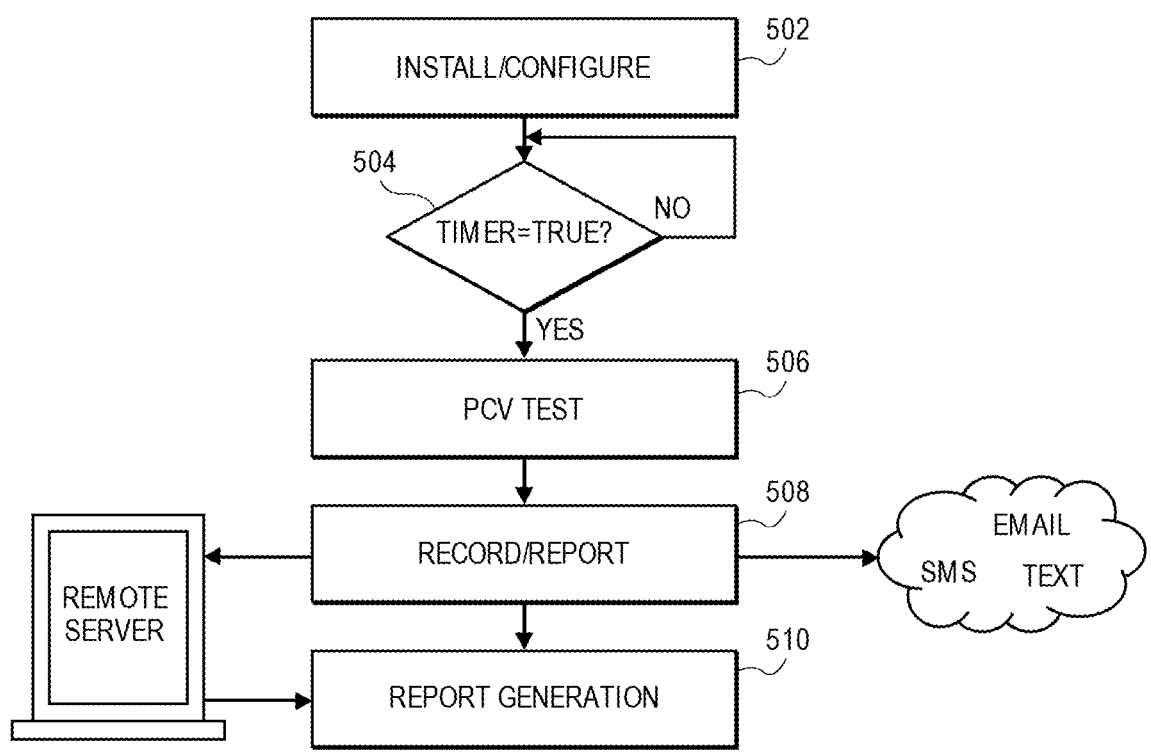
FIG. 5 is a flowchart of a method of monitoring protective case usage of a device, in accordance with an aspect.

Referring to FIG. 5, a flowchart of a method of monitoring protective case usage of a device is shown in accordance with an aspect. At an initial stage 502, a user of device 302 can install and configure PCV test application 314. PCV test application 314 can be installed on a smartphone to work with a vibration motor and accelerometer component inside the smartphone to determine whether the smartphone is installed inside of protective case 200. More particularly, PCV test application 314 can perform self-contained periodic testing, e.g., daily testing, using internal hardware components to verify and record a presence (or absence) of an external protective case on device 302 at the time of the test.

At stage 502, device processor(s) 306 set up PCV test application 314 on device 302. Device processor(s) 306 can execute application software that leads the user through initialization tasks. The initialization tasks can include: creating a user login and account to associate device 302 with the remote database on remote server 304, verify functionality of sensors 312, recording a baseline frequency response indicative of device 302 without protective case 200, or entering information about protective case 200 to determine a frequency response spectrum specific to protective case 200 and/or device-case system 100 having a similar reference device 104 installed in a similar reference case 102.

In an aspect, PCV test application 314 can prompt the user of device 302 to create an account on remote server 304. Creation of the account can include a user input of a user name and/or password. The user can associate device 302 and protective case 200 with the account using alphanumeric entries, selections of products from lists, etc. A make, model, or serial number of device 302 can be recorded for the account. Similarly, a make, model, or serial number of protective case 200 can be recorded for the account. In an aspect, the identification information for device 302 can be gathered automatically by server processor 320 from device processor 306 without a need for user input. Similarly, the identification information for protective case 200, e.g., the identifier of protective case 200, can be gathered automatically by device processor 306 from NFC tag 206 using NFC reader 350.

The configuration of PCV test application 314 can include determining impulse response signals indicative of device 302 not being protected by protective case 200. In an aspect, device processor(s) 306 can execute a "stand alone" test sequence to determine the predetermined impulse response signal indicative of device 302 not protected by protective case 200. To collect baseline "stand-alone" accelerometer time domain data, device processor(s) 306 can be configured to drive electromechanical transducer 310 with a baseline input signal when protective case 200 is not mounted on device 302. Electromechanical transducer 310 can generate a baseline force, e.g., as part of a vibration, and the baseline force can be transmitted through internal circuit board 402 and/or the device housing, which is unprotected. Sensor 312, e.g., an accelerometer, of device 302 can detect the baseline input force and generate a corresponding baseline output signal. The baseline output signal can be time domain data representing an impulse response of device 302 when electromechanical transducer 310 is actuated without protective case 200 installed to absorb the vibration energy. Device processor(s) 306 can receive the baseline output signal generated by the one or more sensors 312 of device 302 in response to the baseline force. In an aspect, device processor(s) 306 can determine the predetermined impulse response signal based on the baseline output signal. For example, device processor(s) 306 can apply an FFT algorithm to the collected time domain data to generate a frequency response spectrum. FFT algorithm can be a fast computational algorithm for performing a discrete Fourier transform (DFT). The FFT algorithm can be used to process the accelerometer waveform data (time domain data) to create a corresponding frequency response spectrum (frequency domain data). The generated frequency response spectrum can represent the impulse response signal for the unprotected device 302, and thus, can be the predetermined impulse response signal. The predetermined impulse response signal can be used to verify whether protective case 200 is being used on device 302, as described below.

The configuration of PCV test application 314 can include determining impulse response signals indicative of device 302 being protected by protective case 200. In an aspect, device processor(s) 306 can retrieve a predetermined impulse response signal from one or more memory locations of PCV system 300. For example, device processor(s) 306 can execute searches on one or more library collections in an in-application library collection, in a database stored in device memory 308 or server memory 322, or in any other networked location. The search can be for a known frequency response spectrum. The known frequency response spectrum can represent an impulse response of reference case 102 that is similar to protective case 200, reference device 104 that is similar to device 302, or a combination of reference device 104 and reference case 102 that is similar to device-case system 100 having protective case 200 mounted on device 302. Accordingly, the known frequency response spectrum can represent the impulse response signal for device-case system 100, and thus, can be the predetermined impulse response signal. The predetermined impulse response signal can be used to verify whether protective case 200 is being used on device 302, as described below.

The referenced library collection(s) can be sets of known frequency response spectrums associated with the most popular makes and models of smartphone protective cases being sold in the marketplace. The library collection(s) of frequency response spectrums is used by PCV test application 314 to acquire the branded case frequency response spectrum matching the brand/model of protective case 200 being installed on device 302 by the user.

During the installation and configuration of PCV test application 314, the user can install device 302 into protective case 200. When device 302 is inserted into the interior of protective case 200, PCV test application 314 may attempt to automatically confirm that protective case 200 is the case product that the user designated. For example, NFC reader 350 of device 302 may attempt to read and/or record the identifier from NFC tag 206. The identifier can be a digital identification code having a data string. The digital identification code can include coding that identifies the specific brand and model of device(s) intended to fit into protective case 200. Also embedded in the data string can be coding that identifies the brand and model number of protective case 200. The data string can also include coding segments for the serial number and/or date of manufacture of the protective case 200. Additionally, the data string can include coding to convey the material types and properties, such as density and durometer, of the rubber or plastic materials used in the fabrication of the protective case 200. Furthermore, the digital identifier code can include coding segments to convey additional mechanical properties of the protective case 200 such as weight, geometry (length, width, or thickness), and case type/style. The digital identifier code may include a segment with a URL address that links directly to the known frequency response spectrum of that particular brand/model of protective case 200 and/or the known frequency response spectrum of that particular case used in combination with the particular device 302 associated with the PCV account.

The digital identification code stored in the identifier of NFC tag 206 may be encrypted using asymmetric keys, e.g., a public key/private key combination. It is noted that encrypting the digital identifier code can prevent manufacturers of black market counterfeit protective cases 200 from being able to copy the digital identifier code. If manufacturers were able to copy the digital identifier codes, some manufacturers could attempt to trick the PCV test application 314 to allow counterfeit protective cases 200 to masquerade as genuine protective cases 200.

At stage 504, device processor(s) 306 can execute a test timer sequence of PCV test application 314. The test timer sequence monitors a time of a system clock running on device 302 and initiates a test start command when the timer function indicates that a predetermined state occurs. For example, PCV test application 314 can be configured to perform PCV testing at pre-specified or random times. In an aspect, PCV test application 314 performs daily testing of device-case system 100. For example, a default start time, e.g., 3 a.m., can be set in PCV test application 314. Alternatively, the default start time can be a time referenced to an event, such as at a random time occurring after at least one hour of immobility (non-movement) of device 302. The test timer function can monitor the system clock and/or system outputs such as a motion signal from sensor(s) 312 to determine when the start condition is met. For example, the test timer function can monitor the system clock to determine whether it is 3 a.m., or the test timer function can monitor data sampled by a gyroscope, an accelerometer, and/or a motion co-processor to determine whether device 302 is currently, or has recently, been in motion. When the monitored system outputs match or satisfy the predetermined condition(s), PCV test application 314 can initiate a PCV test.

When the predetermined condition(s) of the test timer function are not met, e.g., when motion is detected by sensor(s) 312 or processor(s) 306 of device 302, the PCV test can be rescheduled for a later time. For example, when device 302 is moving at a default start time, the start time can be delayed by a predetermined amount of time, e.g., one hour. Similarly, when the test timer function determines that device 302 has not been stationary for the predetermined period of immobility, the test timer function can continue to monitor device motion until the period of immobility is met.

At stage 506, device processor(s) 306 can execute a PCV test sequence of PCV test application 314. The PCV test can determine whether protective case 200 is installed on device 302 by using the device components to create and monitor an impulse response of device 302 and then compare frequency content of the impulse response to predetermined information about an impulse response of device-case system 100 or a reference device-case system. The operations of stage 506 relate to aspects shown in FIGS. 6-9, which are described in combination below.

Figure 6:
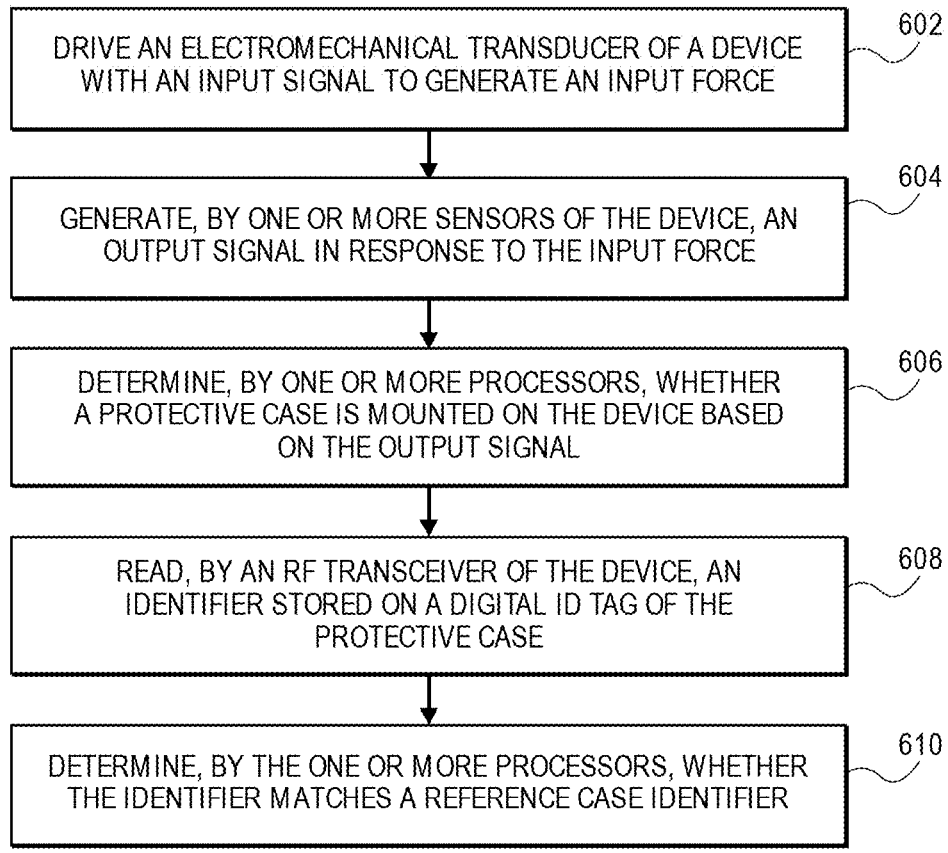
FIG. 6 is a flowchart of a method of verifying protective case usage, in accordance with an aspect.

Referring to FIG. 6, a flowchart of a method of verifying protective case usage is shown in accordance with an aspect. When the start command initiates the PCV test, PCV test application 314 may present a notification window on the display of device 302 to inform the user that the PCV test is about to be executed. As a preliminary operation in the PCV test, the PCV test application 314 may record a charging status of battery 410, and orientation data corresponding to a position or movement of device 302. For example, PCV test application 314 can record data from the compass, the gyroscope, or the accelerometer as information indicative of a preliminary state of device 302 and/or device-case system 100.

At operation 602, when the PCV test application 314 receives the start command, device processor(s) 306 can drive electromechanical transducer 310 with an input signal to generate input force 406. The input signal can have a predetermined pattern to generate a predetermined vibration signal, e.g., a vibration test pattern. The vibration test pattern can include several waveform segments with respective waveform shapes, frequencies, or amplitudes. For example, the input signal can be a sinusoidal signal provided to electromechanical transducer 310 over a period of time, e.g., 3 seconds, to cause a corresponding constant vibration of electromechanical transducer 310 over the 3 second period.

At operation 604, sensor(s) 312 of device 302 can generate an output signal in response to input force 406. Device processor(s) 306 can receive the output signal from sensor(s) 312 over the period of time that electromechanical transducer 310 generates the vibration test pattern. For example, device processor(s) 306 can read and record data from sensor(s) 312 for a 3 second period after device processor(s) 306 begin driving electromechanical transducer 310. Similarly, device processor(s) 306 can simultaneously monitor the gyroscope and the compass to collect the motion signal(s) for test signal validity confirmation, as described below.

In an aspect, device processor(s) 306 can use the motion signal data received from one or more sensors 312 of device 302 to determine whether the output signal corresponding to the input force 406 is a valid test signal. For example, if device 302 is handled and/or moved during the PCV test, the test may be declared invalid because movement of device 302 by the user may obfuscate the impulse response of device 302 to vibrations generated by electromechanical transducer 310. Accordingly, device processor(s) 306 can determine whether the output signal of the accelerometer is a valid test signal based on whether the motion signal(s) indicate movement of device 302 when the output signal is generated. For example, if the motion signal(s) indicate movement of the device 302 occurred during the PCV test period, PCV test application 314 can revert to stage 504. More particularly, the PCV test can be rescheduled to a later time.

At operation 606, device processor(s) 306 can determine whether protective case 200 is mounted on device 302 based on the output signal received from sensor(s) 312 in response to the vibration test pattern. For example, in response to determining that no movement of device 302 occurred when the output signal was generated, device processor(s) 306 can use the output signal to draw conclusions about whether an impulse response of device-case system 100 represented by the output signal is indicative of a protected device.

Referring to FIG. 7, a graphical view of a test output signal generated in response to a test input force and a baseline output signal generated in response to a baseline input force is shown in accordance with an aspect. Notably, the test input force can provide the same vibrational input force as the baseline input force. A test output signal 702 generated by sensor(s) 312 of device 302, when viewed in the time domain, can approximate a sinusoidal pattern over the PCV test. Notably, the depicted profile may represent motion in along a single principal axis, however, sensor(s) 312 may generate several output signals representing additional principal axes. Each output signal can be used to make determinations as described below. The sinusoidal profile corresponds to mechanical vibrations of electromechanical transducer 310 when driven by the input signal. In fact, a time domain graph of a sinusoidal vibration input force may be substantially similar to test output signal 702 illustrated in FIG. 7, with the exception of having different amplitude scaling (and being time shifted). In an aspect, device processor(s) 306 can use comparisons between time domain content of output signal 702 and time domain content of a predetermined impulse response signal to determine whether device 302 is protected. As described below, however, comparisons between frequency domain content of output signal 702 and the predetermined impulse response signal may instead be used by processor(s) 306 to determine whether device 302 is protected. A baseline output signal 704 can be generated by sensor(s) 312 of device 302, and when viewed in the time domain, can approximate a sinusoidal pattern over the PCV test. The baseline output signal 704 can be generated by sensor(s) 312 of device 302 when device 302 is in either of two configurations. More specifically, the baseline output signal 704 can be generated by sensor(s) 312 of device 302 when device 302 is in an unprotected configuration as a stand-alone device or alternatively in a protected configuration as part of a device-case system 100.

Figure 8:
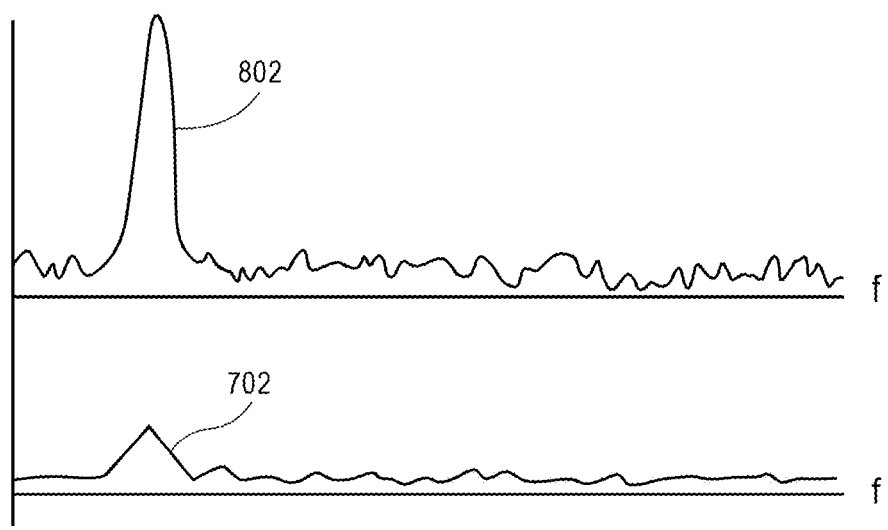
FIG. 8 is a graphical view of a comparison between a test impulse response and a baseline impulse response indicative of an unprotected device, in accordance with an aspect.

Referring to FIG. 8, a graphical view of a comparison between the frequency domain representation of a test output signal 702 (shown in FIG. 7) and the frequency domain representation of a predetermined baseline output signal 704 indicative of an unprotected device is shown in accordance with an aspect. The waveforms shown in FIG. 8 can represent comparative data that device processor(s) may use to perform a first level verification of protective case usage. As described above, a predetermined impulse response signal 802 can be generated from "stand-alone" accelerometer time domain data collected during stage 502 of the PCV test application execution. A baseline output signal 704 (shown in FIG. 7) can be generated by sensor(s) 312 of device 302 in response to the baseline input signal. The baseline output signal 704 can be generated in the time domain, and device processor(s) 306 can apply an FFT algorithm to the time domain data to generate the predetermined impulse response signal 802. The predetermined impulse response signal 802 corresponds to an unprotected device 302. Device processor(s) 306 can apply an FFT algorithm to the time domain data of test output signal 702 (shown in FIG. 7) to determine the frequency content of test output signal 702 generated at operation 604. The frequency content of test output signal 702 can be termed a test data frequency response spectrum.

In an aspect, device processor(s) 306 are configured to perform level one verification to determine whether any type of protective case 200 is mounted on device 302 based on whether test data frequency response spectrum 702 matches predetermined impulse response signal 802 for an unprotected device 302. Device processor(s) 306 can perform the first level of verification by comparing the test data frequency response spectrum 702 to predetermined impulse response signal 802. The first level of verification can verify whether any type of protective case, e.g., a generic case such as a thin case skin, a more robust case, etc., is mounted on device 302. More particularly, the properties of a protective case that determine a profile of the frequency content of vibration data recorded by the accelerometer of device 302 includes a weight of protective case 200, a geometric size and shape of protective case 200, or properties of materials used in the manufacture of protective case 200. When any type of protective case 200 is mounted on device 302, the inherent mechanical properties of the case will absorb energy and resonate energy when subjected to vibrational stimulus, and thus, the impulse response of device-case system 100 will differ from the predetermined impulse response of a standalone device 302. By comparing the frequency response spectrum of the device 302 under test with the known frequency response spectrum of a standalone device 302, a difference in the spectra (not matching) can indicate that the device 302 under test is protected by some case, even if the exact model of the case is unknown. The difference in the spectra can be a difference in the peak frequency or a difference in amplitude of the peak frequency. Additionally, the difference in the spectra can be observed in the results of waveform calculations such as power spectral density or root mean square. Accordingly, device processor(s) 306 determining if test data frequency response spectrum 702 matches predetermined impulse response signal 802 for an unprotected device 302 can identify a mismatch in the test and reference profiles to determine that the first level verification result is a PASS value. By contrast, if the frequency response spectrum of the device 302 under test is identical or similar to (matching within a predetermined tolerance) the known frequency response spectrum of a standalone device 302, the match indicates that the device 302 under test is unprotected. Accordingly, device processor(s) 306 can determine that the first level verification result is a FAIL value.

Figure 9:
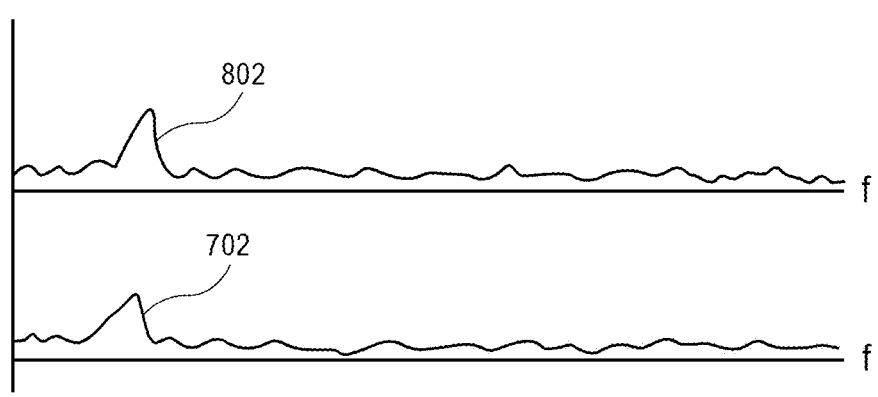
FIG. 9 is a graphical view of a comparison between a test impulse response and a baseline impulse response indicative of a protected device, in accordance with an aspect.

Referring to FIG. 9, a graphical view of a comparison between a test output signal and a baseline impulse response indicative of a protected device is shown in accordance with an aspect. The waveforms shown in FIG. 9 can represent comparative data that device processor(s) may use to perform a second level verification of protective case usage. As described above, a predetermined impulse response signal 802 can be generated or retrieved by device processor(s) 306 during stage 502 of the PCV test application execution. For example, impulse response data representing predetermined impulse response signal 802 of a reference device-case system 100 can be stored in system memory 308, e.g., in an in-app library. Device processor(s) 306 can retrieve the impulse response data corresponding to the device and protective case information entered during installation and configuration of PCV test application 314. Accordingly, device processor(s) 306 can access frequency domain data representing an impulse response of a similar or identical device-case system to the same input force 406 applied to device 302 during the PCV test. Additionally, device processor(s) 306 can apply an FFT algorithm to the time domain content of test output signal 702 (shown in FIG. 7), generated at operation 604, to determine the test data frequency response spectrum.

In an aspect, device processor(s) 306 are configured to determine whether protective case 200 is mounted on device 302 based on whether the frequency content of test output signal 702 matches predetermined impulse response signal 802 for a protected device 302. Device processor(s) 306 can perform the second level of verification by comparing the test data frequency response spectrum 702 to frequency content of predetermined impulse response signal 802. The second level of verification can verify whether a particular protective case, e.g., a protective case having the same brand/model as was entered during stage 502, is mounted on device 302. More particularly, when test data frequency response spectrum is the same or similar to (matching within a predetermined tolerance) the expected impulse response 802 for a similar device-case system, device-case system 100 can be assumed to be the same as the reference device-case system. This result is illustrated in FIG. 9, in which predetermined impulse response 802 matches test data frequency response spectrum 702. Accordingly, device processor(s) 306 can determine that the second level verification result is a PASS value. By contrast, if the frequency response spectrum of the device 302 under test is different than (not matching) the expected impulse response 802, device processor(s) 306 can determine that the second level verification result is a FAIL value.

Referring again to FIG. 6, device processor(s) can perform a third level of verification by verifying that the digital ID tag 206 on protective case 200 has an expected identifier. The identifier of digital ID tag 206 can be entered or read during stage 502, as described above. The identifier that is read from digital ID tag 206 during the configuration of PCV test application 314 is a reference identifier. More particularly, the reference identifier is an expected value of the identifier at any point after configuration and registration. For example, if an owner of device 302, e.g., an employer, installs protective case 200 having the reference identifier on device 302 prior to issuing device 302 to a user, e.g., an employee, the employer may expect that any time the NFC tag 206 on protective case 200 is queried thereafter, the identifier would match the initial identifier value. Any difference in the identifier values may indicate that the employee has changed the protective case 200 to a different (and potentially impermissible) protective case 200. When no digital ID tag 206 is present on protective case 200, e.g., when protective case 200 is a generic case that does not include digital ID tag 206, the third level of verification can be omitted by PCV test application 314. When digital ID tag 206 is present on protective case 200, however, the third level of verification can be performed.

At operation 608, RF transceiver 350 of device 302 reads the identifier stored on digital ID tag 206 of protective case 200. Device processor(s) 306 can therefore obtain both the test identifier and the reference identifier entered at stage 502. At operation 610, device processor(s) 306 can determine whether the test identifier matches the reference identifier. More particularly, device processor(s) 306 can compare the test identifier read by RF transceiver 350 during the PCV test to the expected reference identifier value determined during configuration of PCV test application 314. In an aspect, when the test identifier matches the reference identifier, device processor(s) 306 can determine that the third level verification result is a PASS value. By contrast, when the test identifier does not match the reference identifier, device processor(s) 306 can determine that the third level verification result is a FAIL value.

One or more of the first level, second level, or third level verification sequences described above may be combined to generate a more rigorous verification. For example, the third level verification can be combined with the second level verification to provide an increased level of confidence that device 302 is being protected by an expected protective case 200. More particularly, when the results of the digital identifier code verification and a second level frequency response spectrum comparison are both PASS values, then a heightened level of verification can be provided by device processor(s) 306. Similarly, the second level verification can be combined with the first level verification to provide an increased level of confidence that device 302 is being protected by a protective case 200 having a similar degree of impact protection as the expected protective case 200.

Referring again to FIG. 5, at stage 508, PCV test application 314 can perform PCV test recording and/or reporting functions. More particularly, after determining a presence or absence of protective case 200 on device 302, PCV test application 314 can record the PASS/FAIL test values for each verification level in system memory, e.g., in device memory 308. Furthermore, device 302 can transmit the test values to remote server 304 for recording and storage in server memory 322, e.g., in a database stored on remote server 304. A database software application running on remote server 304 can maintain records of the PCV test values. The database software application can maintain a record of all PCV test PASS and FAIL values for all three levels of verification from each PCV test executed by device processor(s) 306.

In an aspect, PCV test results are reported to one or more interested parties. For example, device processor(s) 306 can present a notification window on the display of device 302 to the user. For example, the notification window can include an alert indicating that the PCV test failed because an expected protective case 200 was not detected. If the user believes that the failure was an error, PCV test application 314 can allow the user to initiate a new PCV test to generate a PASS value that can override the previous FAIL value.

RF communication circuitry 316 of device 302 can report PCV test results to one or more third parties. For example, when PCV test application 314 is on a company-owned device 302, a PCV test FAIL value can be reported to a responsible asset administrator of the company via email or SMS text. Similarly, when PCV test application 314 is on a device 302 that is insured by an insurance company, a PCV test FAIL value can be reported to the insurance company via email or SMS text. When the insurance company has insured device 302 under an insurance policy at a reduced rate, the insurance company may use the reported test values as evidence that the user has broken the terms of the policy requiring device 302 to be kept inside of a specific protective case 200, and the insurance company may terminate or increase the charged rate of the policy, accordingly.

It will be appreciated that PCV test results may be reported to the interested parties by remote server 304. For example, the company that owns device 302 and/or the insurance company that insures device 302 can register with an information service provided by remote server 304. Remote server 304 can relay test results automatically or in response to requests from the registered third parties.

At stage 510, PCV system 300 can generate a PCV test report. The PCV test report can be a summary of test results of verified protected case usage over a specified period of time, e.g., weeks, months, or years. The report can be generated by remote server 304 or device 302. More particularly, remote server 304 and/or device 302 can include a report generation software application to generate the report using test data residing in memory of PCV system 300. For example, the report generation software application can generate the PCV test report using data collected and stored in server memory 322. The report generation can be responsive to a request from an authorized party. For example, the user of device 302 may choose to request the PCV test report in preparation to offer device 302 for sale to potential buyers. The prospective buyers can review the PCV test report to confirm the time duration that device 302 has been protected by a case during its prior use.

Referring to FIG. 10, a pictorial view of a protective case verification report documenting protective case usage by a device is shown in accordance with an aspect. The test report generation application can create and maintain copies of the PCV test report 1000 for distribution upon request. For example, when an authorized party requests the PCV test report 1000, the test report generation application can email the PCV test report, e.g., as a .pdf document. The test report generation application may alternatively send a URL web link for the requestor to access the PCV test report or to use in on-line listings for reference by potential purchasers. The potential purchasers can review an on-line copy of the PCV test report residing on remote server 304 via the web link.

As shown in FIG. 10, the PCV test report document 1000 can be dated, and can identify the brand/model of protective case 200. Similarly, information about device 302, e.g., brand, model, serial number, etc., can be provided in the report. The report can include verification information 318 communicated by device 302 to remote server 304. For example, the PCV test report 1000 can document a level of verification 1002 that protective case 200 is mounted on device 302. More particularly, the report can indicate whether device processor(s) 306 achieved a first level of verification 1002 (comparison to a standalone device), a second level of verification (comparison to a reference device-case system), and/or a third level of verification (digital identifier code verification). Verification information 318 represented in PCV test report can also include a percentage of time 1004 that protective case 200 is mounted on device 302. More particularly, the percentage of time 1004 that the PCV test application 314 had PASS values for each of the supported levels of verification (level one, level two, and level three) during the report timeframe can be shown. For example, in the example of FIG. 10, device 302 was protected by protective case 200 99.3% of the time between Jan. 5, 2017, and May 30, 2017. Such verification information 318, and other verification information generated as described above, can be valuable information.

In an aspect, PCV test application 314 is directed to reducing a likelihood that a counterfeit protective case will be used on device 302. An unfortunate trend in the electronics industry can be found in the proliferation of counterfeit products. Counterfeiters may attempt to build protective cases having cloned digital ID tags 206, e.g., NFC or BT tags, to make PCV test application 314 indicate that device 302 is protected by a particular brand/model of protective case, when in fact the protective case is not the particular brand/model. Counterfeiters may attempt to read the identifier of an authentic digital ID tag on an authentic protective case, and then clone the digital ID tag. The cloned digital ID tag can be placed on counterfeit protective cases and sold to unwary consumers.

In an aspect, PCV test application 314 can perform a dual-test format, which is capable of issuing a third level verification value of FAIL when a protective case includes a cloned NFC tag 206. More particularly, the NFC tag identifier may indicate that the data string matches the expected data string, however, the impulse response of the device-case system 100 including the counterfeit protective case may differ from the impulse response of the reference device-case system. The difference can be caused by manufacturing differences in the counterfeiting process, e.g., using low grade materials. Accordingly, the second level verification value will be FAIL. By contrast, the impulse response will differ from a standalone device, and thus, the first level verification value will be PASS.

In the dual-test format, a third level verification value of PASS is only achieved when both the second level and the third level verifications have PASS values. More particularly, if the NFC tag 206 is cloned accurately, the counterfeit case may achieve a third level verification value of PASS, however, the second level verification value will be FAIL. As such, the highest level of verification 1002 for the device-case system 100 under test will be a first level of verification, indicating that device 302 is protected by a generic case. Additionally, as described above, the identifier in NFC tag 206 can be encrypted to reduce a likelihood that counterfeiters will successfully clone NFC tag 206.

In an aspect, PCV test application 314 and or protective case 200 are configured to reduce a likelihood that a salvaged NFC tag will be inserted into a generic protective case to make PCV test application 314 indicate that device 302 is protected by a particular brand/model of protective case, when in fact the protective case is not the particular brand/model. A user may peel a self-adhesive NFC tag out of a genuine protective case and then slip the salvaged NFC tag between their device 302 and a generic protective case. In such case, PCV test application 314 may read the NFC tag as indicating that the protective case is an expected brand/model protective case, when in fact the protective case is generic and potentially does not provide the expected level of protection to device 302.

The potential problem of a salvaged NFC tag thwarting PCV test application 314 may be mitigated by the dual-test format described above. More particularly, the salvaged NFC tag may cause PCV test application 314 to determine a third level verification value of PASS, however, the second level verification value will be FAIL because the generic case will not have the same impulse response as the expected case. Accordingly, the highest level of verification 1002 will revert to a first level of verification.

To further reduce a likelihood that a user will successfully salvage an NFC tag, NFC tag 206 may be tamper-resistant. In an aspect, NFC tag 206 can include a seam that tears or breaks when removed from protective case 200. For example, the seam may be pre-stressed, weakened, or otherwise formed with a tear strength that is less than a force required to remove NFC tag 206 from protective case 200. Accordingly, when a user attempts to peel NFC tag 206 from wall 202 of protective case 200, the seam may tear, which can cause damage to the antenna windings of the NFC tag 206. In an aspect, the windings may run across the seam, making it more likely that the winding will be damaged when the seam tears. When the windings are damaged, salvaged NFC tag 206 becomes inoperable.

In an aspect, a likelihood of removing digital ID tag 206 from protective case 200 may be reduced by encasing NFC tag 206 within wall 202 of protective case 200. For example, as described above, NFC tag 206 can be embedded within the plastic of protective case 200 during an injection molding fabrication process. In an aspect, digital ID tag 206 is encased in an offset position, relative to a thickness of wall 202. More particularly, wall 202 of protective case 200 may have a thickness extending from an exterior surface to an interior surface. The exterior surface may be a surface facing the surrounding environment, and the interior surface may be a surface facing and/or in direct contact with device 302 when the device is installed in protective case 200. NFC tag 206 may similarly have an outer surface and an inner surface, each of which are parallel to the exterior and interior surfaces of wall 202. In an aspect, a distance between the outer surface of NFC tag 206 and the exterior surface of wall 202 may be greater than a distance between the inner surface of NFC tag 206 and the interior surface of wall 202. More particularly, NFC tag 206 may be embedded in wall 202 at a location that is offset toward the interior surface of wall 202. This offset position of NFC tag 206 can reduce RF field attenuation between NFC reader 350 of device 302 and NFC tag 206 of protective case 200. The reduced attenuation can increase an input voltage that will be generated by the winding of NFC tag 206, making the tag readable by NFC reader 350.

In an aspect, PCV test application 314 and or protective case 200 are configured to reduce a likelihood that a salvaged NFC tag 206 will be taped to the back of a standalone device to make PCV test application 314 indicate that device is protected by a particular brand/model of protective case 200, when in fact the device 302 is unprotected. If a user gained access to a used genuine protective case 200 and peeled the authentic NFC tag 206 off of wall 202, the user could tape NFC tag 206 directly to the back of a device 302 to simulate a protected device 302. More particularly, taping NFC tag 206 to a standalone device may trick PCV test application 314 into incorrectly verifying that the device is protected.

The dual-test format described above may mitigate the salvaged NFC tag problem. More particularly, second level verification of the protective case 200 will fail even if the third level verification passes. Furthermore, during the reading of the identifier during stage 502 and or during the PCV test, device processor(s) 306 can determine a signal strength received from NFC tag 206 when the tag is queried for the identifier. Device processor(s) 306 may further determine whether the signal strength is within a predetermined tolerance. When device 302 is unprotected, e.g., when protective case 200 is not mounted on device 302, the electromagnetic field lines (flux) emanating from the antenna of NFC reader 350 may impart a different signal strength into the antenna windings of NFC tag 206. The different signal strength may also result from the salvaged tag being taped to a different location relative to the transceiver antenna than would be the case in an authentic protective case 200. This difference in the signal strength parameter can be detected by device processor(s) 306 and used to determine that NFC tag 206 is not in or on an authentic protective case 200. The result may be a determination that device 302 is unprotected thus test results are FAIL for all three levels of verification.

It will be appreciated that PCV test application 314 can include additional or modified features as compared to the features described above. For example, PCV test application 314 may track protective case usage as described above, however, the application can allow the user to change to a different protective case 200. For example, if a user changes to a different make/model of protective case 200, PCV test application 314 can report the change to the database on remote server 304. For instance, if the user upgrades their protective case 200 from a thin case skin (only capable of first level verification) to a more durable case that supports second level verification and/or third level verification, the verification information 318 can be communicated from device 302 to remote server 304 for inclusion in the PCV test report.

In an aspect, the sensor(s) 312 used to generate output signal 702 in response to input vibrations may include a microphone. Furthermore, the electromechanical transducer 310 that generates the input vibration may include a speaker. In some instances, device 302 may not include a vibration motor and/or an accelerometer. In either case, during stage 502, PCV test application 314 may be configured to substitute audio data analysis for accelerometer data analysis. At operation 602, device processor(s) 306 can drive an audio speaker to generate an input force 406 (which in turn generates acoustic vibrations). At operation 604, the audio microphone can detect the acoustic vibrations, and in response, generate an output audio signal. In other words, the speaker can generate an input audio pattern and the microphone can record an output audio pattern corresponding to the input audio pattern. The recording can occur concurrently, e.g., simultaneously, with the playback of audio.

In an aspect, the audio input signal includes audio tone segments of differing frequency and differing amplitudes. Device 302 may have several speakers, e.g., a left speaker and a right speaker, and the audio input signal may have respective audio channels to independently drive one or more of the left speaker or the right speaker. For example, sound may be emitted by only one of the left speaker or the right speaker when device processor(s) 306 play back the audio input signal. In another aspect, when device 302 supports several microphones, e.g., a left microphone and a right microphone, the audio input signal may be cross-configured to utilize the stereo microphone functionality in combination with stereo speakers to record more complex audio output signals 702.

In an aspect, during a test, the audio output signal 702 can be recorded in the time domain and processed using an FFT algorithm to generate a frequency response spectrum that represents a test data frequency response spectrum 702 (shown in FIG. 8) of device-case system 100 when an acoustic input is applied to the system. Accordingly, comparisons between the test data frequency response spectrum and a standalone device or reference device-case system spectra can be made to determine whether protective case 200 is mounted on device 302 (operation 608).

Other variations in the input signal used to generate output signal 702 for verifying protective case usage may be contemplated. For example, in lieu of a vibration motor to create the input force 406, the input force may instead result from an externally applied impact. Device 302 may not have an internal vibration motor (or the equipped motor may be too weak to generate an adequate input force 406), and thus, the input force used to generate a corresponding output signal may come from another input source. In an aspect, PCV test application 314 can prompt the user to tap device 302 on an external surface to begin the PCV test. For example, device processor(s) 306 can present a start button on the display of device 302, and after the user taps the button, the user can tap a corner of device 302 on a hard, flat surface. Sensor(s) 312 of device 302 can detect the vibrations resulting from the impact, and generate the test output signal 702 as a time domain representation of the shock. Device processor(s) 306 can determine, based on the test output signal 702, whether protective case 200 is mounted on device 302 by comparing the frequency response spectrum to the standalone device or reference device-case system spectra. The comparison can indicate whether protective case 200 is mounted on device 302 (operation 606).

Impacts from accidental drop events may also be used as the input force 406 of the PCV test. Device processor(s) 306 can monitor sensor(s) 312 in real-time and record impact data from real life accidental drop events. For example, processor(s) 306 can determine that device 302 is in a free fall state based on motion data from sensor(s) 312. When the free fall state is followed by an impact, processor(s) 306 can use motion data preceding the impact and the impact data to determine whether device 302 was in protective case 200 at the time of the drop.

In an aspect, device processor(s) 306 can use orientation data from sensor(s) 312 to determine an orientation of device 302 at the time of impact. For example, device processor(s) 306 can determine whether device 302 landed on a corner or on a back surface based on the orientation data. Similarly, device processor(s) 306 can determine a height from which device 302 was dropped based on an elapsed duration of the free fall state. The drop height can be used to determine a magnitude of the impact force and/or a velocity at impact. By combining the information about the orientation and the velocity at impact, the resulting accelerometer impact measurements for each drop event can be determined and recorded, e.g., written to a database on remote server 304. The impact measurements can represent a shock damping characteristic of device-case system 100 for the particular drop height and impact orientation. Remote server 304 can validate the impact measurements against predetermined impact measurements for similar device-case systems. For example, the impact measurements can be compared to impact measurements collected for reference device-case systems dropped from similar (within a tolerance) heights and at similar (within a tolerance) impact orientations. The comparison may be made by device processor(s) 306 or by server processor(s) 320. For example, PCV test application 314 may periodically download baseline statistical modeling factors representing impact measurements that were calculated based on a large set of data from drop events experienced by other device-case systems having the same device in the same protective case. The downloaded factors may be used for comparison. Alternatively, server processor 320 can receive the impact measurements from the other device-case systems and store them in the database for comparison to impact measurements received from device 302. Based on such comparisons, PCV test application 314 can verify that the second level verification is a PASS value when the impact measurements from device 302 match the baseline statistical modeling factor, or a FAIL value when the impact measurements from device 302 do not match the baseline statistical modeling factor.

In an aspect, a timer feature may be implemented such that any attempt to read digital ID tag 206 can trigger an update to the timer function which records a duration of time that device 302 is installed inside protective case 200. At stage 502, when NFC reader 350 queries NFC tag 206, and receives the identifier, PCV test application 314 can start a tag duration timer. PCV test application 314 can record the start date, start time, and start GPS coordinates. While the tag duration timer is running, PCV test application 314 can periodically access the NFC read function of device 302 to verify that protective case 200 remains installed on device 302. More particularly, NFC reader 350 can be controlled to read the identifier from NFC tag 206 periodically while the tag duration timer is active. The periodic attempts to access data in NFC tag 206 may be triggered by a periodic timer function. In an aspect, the periodic access attempts are triggered by software functions that can monitor and/or make calls to certain operating system functions. For example, one or more NFC tag duration timer functions may reside in the operating system of device 302. As an example, an NFC tag duration timer read function may be built into the operating system. To implement the periodic reading of data from NFC tag 206, PCV test application 314 may make periodic calls to the NFC tag duration timer function(s) noted above. Alternatively, the NFC read functions supporting the tag duration timer can be built into the operating system and they may also independently periodically monitor for the presence of NFC tag 206. In the event that the NFC tag duration timer read function determines NFC tag 206 is no longer within range of NFC reader 350, the NFC tag duration timer read function can notify PCV test application 314. Upon notification by the NFC read functions in the operating system, PCV test application 314 can stop the tag duration timer and record the end date, end time, and end GPS coordinates. PCV test application 314 can transmit the start and end information to remote server 304 for use in determining a percentage of time 1004 that device 302 was protected.

Operating system calls of device 302 may be used to initiate the PCV test. At stage 504, a start test command may be implemented in response to monitoring one or more calls being made to the operating system functions. For example, if the device processor(s) 306 observe operating system calls being made to establish an NFC communication link with wireless charging plate 414, device processor(s) 306 may initiate a special code sequence with the goal of starting and completing the next PCV test while device 302 is resting on wireless charging plate 414. The accuracy and repeatability of the PCV test may be enhanced by performing the PCV test while device 302 is resting on a surface of known physical properties, such as the surface of a particular brand/model of wireless charging plate 414. Accordingly, starting the PCV test in response to the NFC communication link being established can result in improved test accuracy. In an aspect, PCV test application 314 may reference a database stored in system memory 308, which details the known physical characteristics and properties of the contact surface of one or more wireless charging plates on the market. For example, the wireless charging plates may be several of the best-selling charging accessories. Accordingly, frequency response spectra used by PCV test application 314 during the PCV test, e.g., at operation 606 and/or during second level verification, can further account for specific mechanical surface interactions between device-case system 100 and wireless charging plate 414 on which the system rests. In an aspect, PCV test application 314 may reference a database stored in system memory 308, which contains predetermined baseline frequency response spectra for device-case system 100 resting on different make(s)/model(s) of wireless charging plate 414.

In an aspect, digital ID tag 206 can store information in addition to the identifier. For example, NFC tag 206 may encode information that can be used by device 302 to adjust settings of the PCV test. The settings may include a frequency, amplitude, or duration of the input signal that is used to drive electromechanical transducer 310. For example, during stage 502, NFC reader 350 can read setting information from NFC tag 206, and PCV test application 314 can be configured to with the settings. When PCV test begins, device processor(s) 306 can deliver the predetermined input signal (which is specific to the particular protective case 200) to cause electromechanical transducer 310 to generate a predefined vibration. For example, the predefined vibration may be at a resonant frequency of the protective case 200. Accordingly, the settings of PCV test application 314 may be configurable based on data stored on NFC tag 206.

Figure 11:
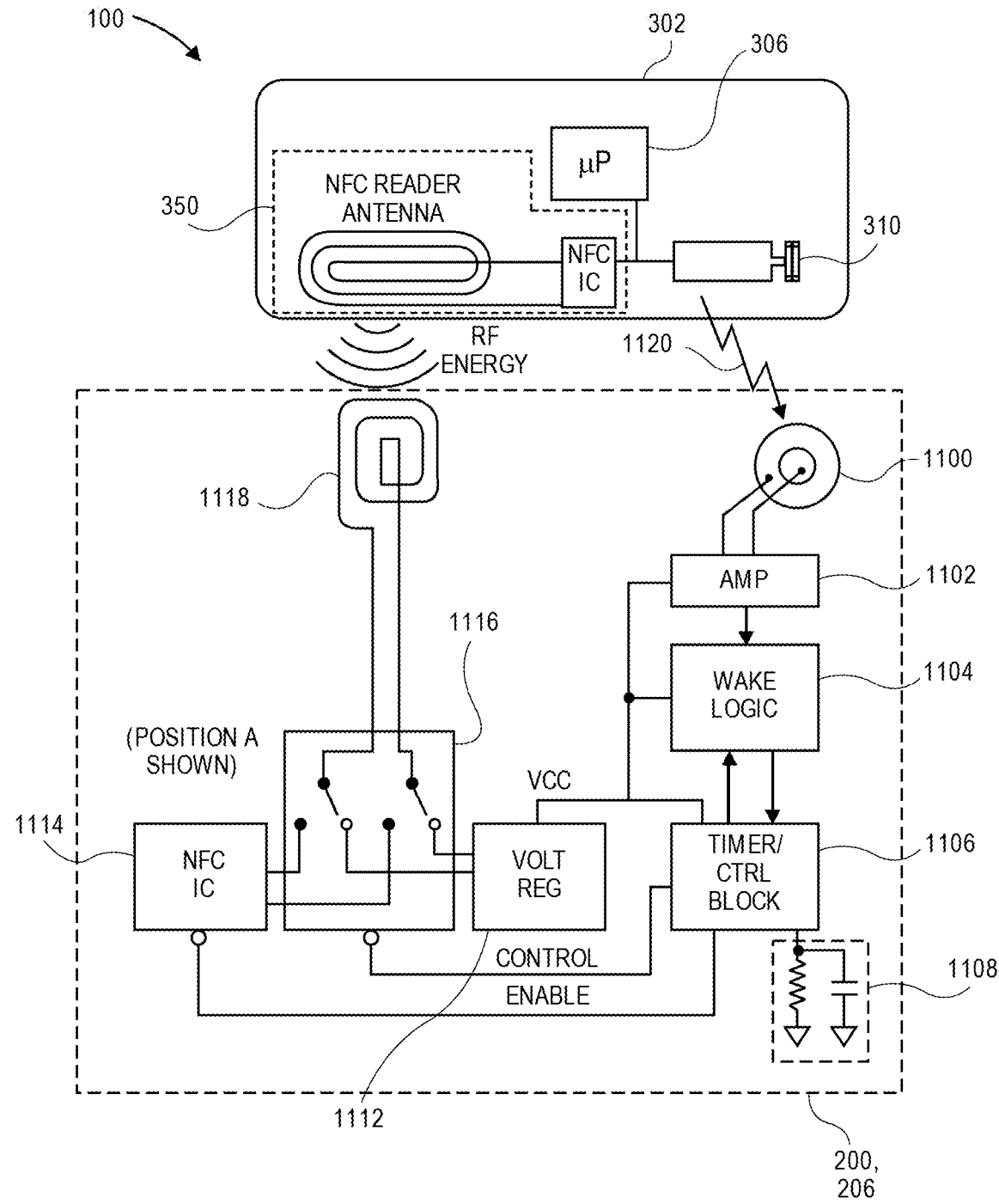
FIG. 11 is a block diagram of a system having a dormant near-field communication tag for verifying protective case usage, in accordance with an aspect.
Figure 12:
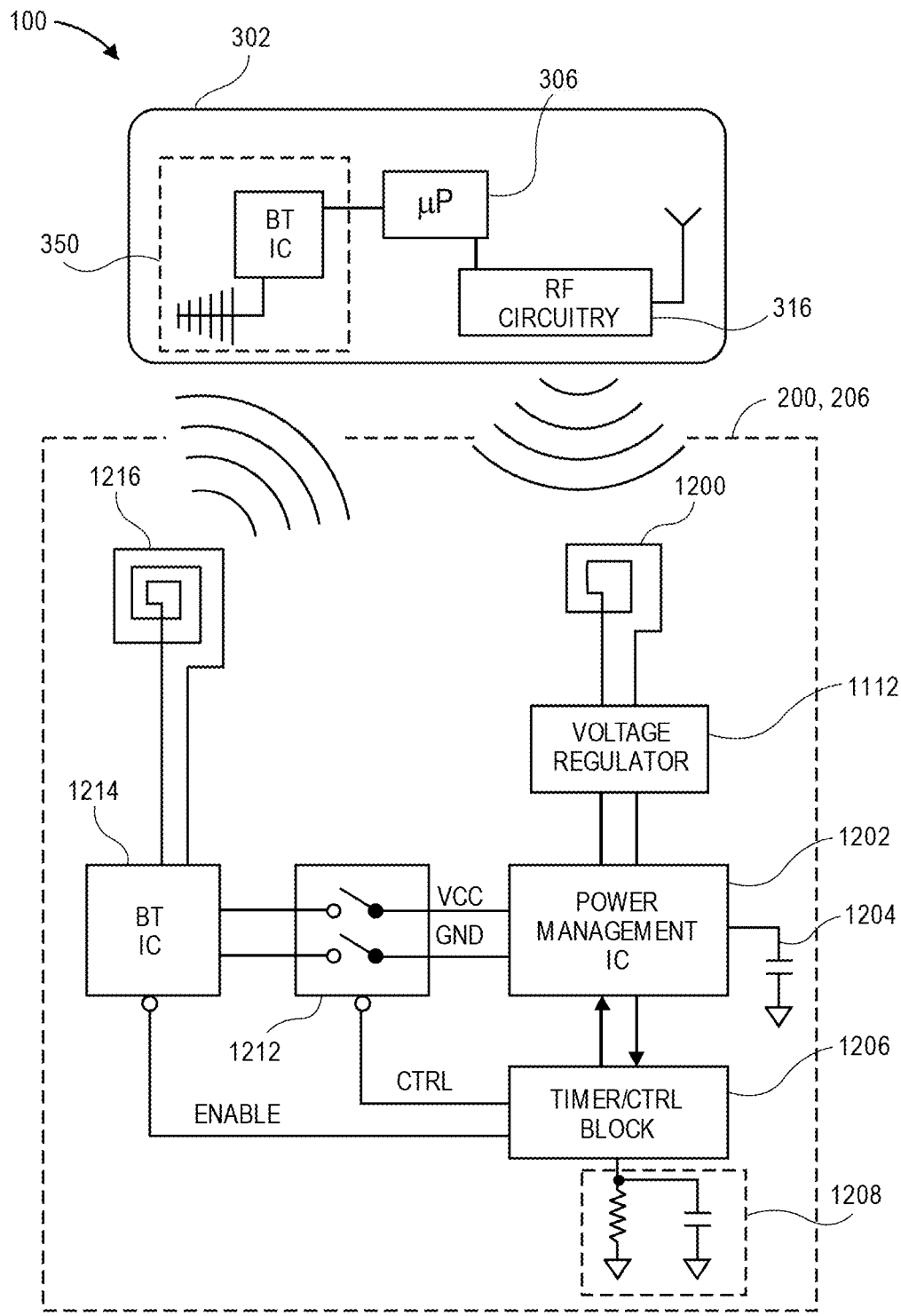
FIG. 12 is a block diagram of a system having a dormant Bluetooth communication tag for verifying protective case usage, in accordance with an aspect.

Referring to FIG. 11, a block diagram of a system having a digital ID tag for verifying protective case usage is shown in accordance with an aspect. Device-case system 100 can include device 302, e.g., a smartphone device, having the components described above. For example, device 302 can be a smartphone device having the components described with respect to FIG. 4. Furthermore, device-case system 100 can include digital ID tag 206 mounted on protective case 200 as described above. Protective case 200 can be mounted on device 302 (not shown).

In an aspect, RF transceiver 350 can utilize the NFC protocol to communicate with an NFC-based digital ID tag 206 to implement any of the operations described above. In some cases, when NFC tag 206 is the nearest tag to NFC reader 350, the communication link between device 302 and NFC tag 206 may prevent NFC reader 350 from recognizing other NFC tags in the vicinity. More particularly, the NFC tag 206 within protective case 200, which is within the readable distance of NFC reader 350, may permanently limit the NFC tag reading capability of NFC reader 350 to reading only NFC tag 206. This assignment may prevent communication with other nearby tags, and may interfere with the usability of mobile device 302 in some situations. For example, the user may be unable to interact with an alternate NFC tag. Accordingly, in an aspect, NFC tag 206 can be a dormant NFC tag that can be selectively switched from a dormant state, e.g., a state in which NFC tag 206 cannot communicate information to NFC reader 350, to an active state, e.g., a state in which NFC tag 206 can communicate information to NFC reader 350.

The dormant NFC tag 206 can be incorporated into device-case system 100 in the manners described above. For example, the dormant NFC tag 206 can be insert molded into protective case 200 or mounted on a wall of protective case 200. In an aspect, the dormant NFC tag 206 includes electronic hardware that allows the tag to remain dormant, e.g., non-functional, until it is activated by device 302. Device 302 can perform operations, e.g., device processor(s) 306 can execute instructions stored in device memory 308 (FIG. 3) to cause NFC tag 206 to awaken and/or put NFC tag 206 to sleep. The structure of dormant NFC tag 206 is described below in combination with a functional sequence used by device-case system 100 to wake NFC tag 206 from the dormant state, initiate and complete an NFC read operation of the NFC tag 206 by NFC reader 350 when NFC tag 206 is in the active state, and put NFC tag 206 back to sleep, e.g., place NFC tag 206 into the dormant state.

In an operation, a software application of device, e.g., PCV test application 314, can initiate a read process in which NFC reader 350 will read relevant data from memory of the NFC tag. For example, the read process can be performed as part of operation 608 to support the third level verification that device 302 is protected by protective case 200. NFC tag 206 can initially be in the dormant state. In the dormant state, an NFC tag antenna 1118 of NFC tag 206 can receive NFC radio frequency (RF) energy from NFC reader 350. The RF energy can generate an electrical current in the tag antenna that is communicated to a voltage regulator 1112 used to power components of NFC tag 206. More particularly, a switch, e.g., a double pole-double throw switch 1116, can connect the NFC tag antenna 1118 to the voltage regulator 1112 in the dormant state. The default position of switch 1116 in the dormant state can be termed position A, and as shown, when the switch is in position A the switch can transfer electrical energy from the NFC tag antenna 1118 to the voltage regulator 1112.

The voltage regulator 1112 can have a voltage output at the common collector that powers several tag components used to monitor an activation signal 1120 from device 302, and to switch NFC tag 206 to the active state when the activation signal 1120 is detected. More particularly, the voltage regulator 1112 can power an activation circuit when NFC tag 206 is in the dormant state.

In an aspect, NFC tag 206 includes the activation circuit to detect the activation signal. The activation circuit includes an electromechanical transducer 1100, an amplifier 1102 (optionally), and a wake logic circuit 1104. The activation signal can be generated by device 302 using the actuation modes described above. More particularly, PCV test application 314 can cause device processor(s) 306 to generate a vibration event by actuating electromechanical transducer 310, e.g., a vibration motor, a haptic engine, or a speaker of device 302. The actuated transducer can emit vibration energy in the form of sound and/or physical vibrations. The activation signal 1120 can be termed a "wake signal" when the activation signal is intended to wake NFC tag 206 from the dormant state. The activation signal 1120 can be transmitted from device 302 to NFC tag 206 through physical contact, e.g., when device 302 is in contact with protective case 200 that contains NFC tag 206, or through acoustic coupling, e.g., when device 302 emits sounds across a gap between the device housing and protective case 200. Regardless of the mode of transmission, the activation signal 1120 is input to NFC tag 206 as a mechanical vibration at the tag surface.

It will be appreciated that physical coupling and/or acoustic coupling between protective case 200 and device 302 can be facilitated through a structure of protective case 200. For example, protective case 200 may include a recess in an inner wall adjacent to digital ID tag 206 such that the surface of the inner wall is separated from a back wall of device 302 by an air gap. Conversely, protective case 200 can include a boss, column, raised feature, etc., on the inner wall over digital ID tag 206 such that the raised area ensures contact between protective case 200 and device 302. Accordingly, the combination of protective case 200 and the device housing of NFC tag 206 can facilitate the efficient transmission of the wake signal vibration from electromechanical transducer 310 of device 302 to the electromechanical transducer 1100 of NFC tag 206.

The electromechanical transducer 1100 of NFC tag 206, e.g., an accelerometer, a piezoelectric transducer, or other transducer configured to convert vibrations into electrical signals, can receive the mechanical vibration input from device 302. In an aspect, the electromechanical transducer 1100 is a piezoelectric transducer that receives the wake signal 1120 energy and converts the energy into an electrical signal. The piezoelectric transducer 1100 can be a relatively inexpensive transducer that is sensitive to vibration, and thus, suitable to the dormant NFC tag application. For example, the piezoelectric transducer can include a low cost quartz crystal disc to convert vibrational energy into electrical energy. The electrical signal representing the wake signal 1120 can be transmitted from the piezoelectric transducer 1100 to an amplifier 1102.

The amplifier 1102 can be an operational amplifier configured to amplify the activation signal 1120 received from the piezoelectric transducer 1100. For example, the activation signal may be output by piezoelectric transducer 1100 proportional to the vibration of the input wake signal 1120, and the amplifier 1102 can amplify the signal by a gain factor. After amplifying the wake signal 1120, the amplifier can transmit the amplified signal representing the wake signal to a wake logic circuit 1104. In an aspect, the amplifier 1102 can have a ground connection and a signal connection with the wake logic circuit 1104.

The wake logic circuit 1104 can include analog and digital circuits configured to identify a pattern in the received amplified signal. In an aspect, the wake logic circuit 1104 can include discrete and integrated logic, e.g., logic circuits that are fabricated from both discrete components and integrated logic chips. The wake logic circuit 1104 can include a comparator circuit, a threshold detector circuit, a pattern recognition logic circuit, etc., to determine whether the received amplified signal matches a predetermined pattern. The predetermined pattern can indicate that the vibrations received by the electromechanical transducer are the wake signal 1120 generated by device 302. For example, the wake signal 1120 provided by device 302 may be a sequence of one or more vibration pulses of a predetermined number. Each pulse may have a predetermined duration of vibration, and adjacent pulses can be separated by a predetermined duration of non-vibration. The periods of peaks and valleys in the pulse sequence can represent a binary input, e.g., a high signal of a predetermined duration followed by a low signal of a predetermined duration followed by a high signal of a predetermined duration, and so on. In an aspect, the wake logic circuit 1104 monitors the amplified signal for the predetermined sequence. That is, the wake logic circuit 1104 can decode and identify the wake signal pattern 1120 within the amplified signal.

The wake logic circuit 1104 can include one or more filters to process the wake signal 1120. For example, a band-pass filter or a low-pass filter can be used to filter the wake signal 1120 based on an amplitude or frequency of the signal. More particularly, the input vibration of the wake signal 1120 may have a predetermined frequency, and one or more filters in the wake logic circuit 1104 can be used to only pass activation signals having corresponding frequencies. Accordingly, the filters can clean the input signal as a pre-processing operation precedent to determining whether the input signal matches the predetermined sequence of pulses.

In an aspect, the wake logic circuit can communicate with a timer/control circuit. Communication between the timer/control circuit 1106 and the wake logic circuit 1104 can be two-way communication such that communication signals pass both ways between the tag components. For example, when the wake logic circuit 1104 detects the predetermined pattern indicating that device 302 has provided the activation signal 1120 to NFC tag 206, the wake logic circuit 1104 can send an enable signal to trigger an operation by the timer/control circuit 1106. Similarly, when the NFC read process is complete, the timer-control block 1106 can send a reset signal to the wake logic circuit 1104, as described below.

The timer-control block 1106 can start a timer function in response to receiving the enable signal from the wake logic circuit 1104. More particularly, the timer functions can include actuating the switch 1116 to connect the NFC tag antenna 1118 to an NFC integrated circuit (IC) 1114. More particularly, timer-control circuit 1106 can alter a signal on the control line to the switch 1116 to cause the switch to move (physically or electronically) to a position B (not shown). At position B, the switch 1116 contacts connect the NFC antenna 1118 to the NFC IC 1114. The switch 1116 may include one or more transistors as switches to connect the NFC IC 1114 to the NFC tag antenna 1118. When the switch 1116 is moved from the voltage regulator contacts to the NFC IC contacts, NFC tag 206 is still in the dormant state and will not transition to the active state until the signal on the enable line to NFC IC 1114 is activated. Accordingly, the NFC tag antenna 1118 can power and/or communicate voltage to the NFC IC 1114.

When the timer/control circuit 1106 is enabled, and switch 1116 has been moved to position B, the circuit can then activate the signal on the enable line connected to the NFC IC 1114. The signal on the enable line can be asserted after actuating the switch 1116 to move to position B to connect the NFC tag antenna 1118 to the NFC IC 1114. When the enable line is activated, the NFC IC 1114 can be active and can respond to requests for data content sent by NFC reader 350. More particularly, NFC reader 350 can issue a read command, for example, to perform a third level verification by reading an identifier from the dormant NFC tag 206. The NFC IC 1114 of the active tag can respond to the request by transmitting the contents of a tag memory to NFC reader 350. For example, NFC IC 1114 can send the identifier and/or other information stored in the tag memory to NFC reader 350 via the NFC tag antenna 1118.

In an aspect, the timer/control circuit 1106 can be connected to ground through an analog circuit, e.g., an RC circuit 1108, having a decay rate. For example, a voltage value of RC circuit 1108 can have an exponential decay that decreases from the voltage of the common collector when the switch 1116 is in position A to a lower threshold voltage within a decay period, e.g., within 1-2 seconds, when the switch 1116 is in position B. The decay period represents a period within which NFC reader 350 can read a unique identifier and/or payload information from the NFC IC 1114. More particularly, the active state of NFC tag 206 may last for the decay period, while the timer/control circuit 1106 ensures sufficient energy is stored to activate the enable line and then control switch 1116 to move back to position A to receive external power for operating the voltage regulator 1112. The lower threshold voltage can correspond to the minimum energy required to actuate the switch 1116 to move back to position A. Thus the active state can occur between the time when the timer control circuit 1106 activates the enable line to NFC IC 1114 until the time when timer control circuit 1106 deactivates switch 1116 to move from position B back to position A. By contrast, the dormant state can occur between the time when switch 1116 is moved from position B back to position A until the time when timer control circuit 1106 activates the enable line to NFC IC 1114.

During the active state, NFC reader 350 can receive the NFC tag data, e.g., operation 608. The received information can then be used by the one or more processors of device-case system, e.g., operation 610. Following receipt of the NFC tag data, PCV test application 314 can cause device processor 306 to end the NFC read request. Similarly, the NFC read attempt may end in response to the switch 1116 being reset to position A when the timer/control circuit voltage drops to the threshold voltage. In either case, if the NFC read function was unsuccessful, device 302 can issue a new read request and wake signal 1120 to obtain the relevant data from the NFC IC 1114.

When the RC circuit voltage reaches the predetermined voltage threshold low value, the timer/control circuit 1106 can put the NFC tag 206 back in dormant state causing NFC IC 1114 to end communication with the NFC tag antenna 1118 and NFC reader 350. More specifically, timer/control circuit 1106 can deactivate the control line to switch 1116 to disconnect the NFC tag antenna 1118 from the NFC IC 1114 and to connect the NFC tag antenna 1118 to the voltage regulator 1112 at position A. NFC tag 206 can then be in the dormant state. In the dormant state, the wake circuit 1104 is powered by the NFC tag antenna 1118 without interfering with communications between NFC reader 350 and other nearby NFC tags. Furthermore, in the dormant state, the wake circuit can monitor the output of the piezoelectric transducer 1100 for another wake signal 1120 from device 302 indicating that NFC reader 350 is ready to perform an NFC read operation on NFC IC 1114.

In an aspect, the wake logic circuit 1104 may be reset each time NFC tag 206 transitions from the active state to the dormant state. For example, as part of the reset function when the RC voltage level reaches the low voltage threshold and switch 1116 is moved back to position A, the timer/control circuit 1106 can send a reset signal to the wake logic circuit 1104, e.g., to trigger a reset function of the wake logic circuit. The wake logic circuit 1104 may then be reset to monitor input patterns from the amplifier 1102, and thus, to identify the next wake signal 1120 received by NFC tag 206 from device 302. Additionally, each time NFC tag 206 transitions from the active state to the dormant state the timer control circuit 1106 de-asserts the enable line to NFC IC 1114.

Referring to FIG. 12, a block diagram of a system having a dormant BT tag for verifying protective case usage is shown in accordance with an aspect. Device-case system 100 can include device 302, e.g., a smartphone device, having the components described above. For example, device 302 can be a smartphone device having the components described with respect to FIG. 4. Furthermore, device-case system 100 can include a dormant BT tag 206 mounted on protective case 200 as described above. Protective case 200 can be mounted on device 302 (not shown).

The dormant BT tag 206 can be incorporated into device-case system 100 in the manners described above. For example, the dormant BT tag 206 can be insert molded into protective case 200 or mounted on a wall of protective case 200. In an aspect, the dormant BT tag 206 includes electronic hardware that allows the tag to remain dormant, e.g., non-functional, until activated by a timer-control circuit 1206. Dormant BT tag 206 can support a special timer function responsible for BTLE (Bluetooth Low Energy) broadcast data transmissions occurring very infrequently, e.g., only three or four times per day. In contrast, typical industry standard BTLE beacon ICs are designed to transmit 8,000 to 150,000 broadcast events per day. By significantly decreasing the frequency of BT beacon transmissions dormant BT tag 206 increases available BT bandwidth on device 302 for other BT accessories and also increases available processor bandwidth on device 302 by reducing the data processing overhead associated with near constant BTLE broadcast transmissions. The structure of dormant BT tag 206 is described below in combination with a functional sequence used by timer-control circuit 1206 to wake BT tag 206 from the dormant state, initiate and complete a broadcast transmission of BT tag data to BT radio 350 of device 302 and then put BT tag 206 back to sleep, e.g., place BT tag 206 into the dormant state.

In an operation, device processor(s) 306 can execute code from the PCV test application 314 to configure the BT functions of the operating system of device 302 to direct all BT beacon packets containing the PCV identifier code to the PCV test application 314. Upon power up, timer circuit 1206 of dormant BT tag 206 can initiate a count-down timer whereupon expiration timer circuit 1206 can then initiate an activation sequence resulting in BT data broadcast transmission of relevant data from BT tag 206 to BT radio 350. For example, the data broadcast function can be performed in support of operation 608 to evaluate the third level verification that device 302 is protected by protective case 200. BT tag 206 can initially be in the dormant state. In the dormant state, an energy harvesting antenna 1200 of BT tag 206 can receive radio frequency (RF) energy from active RF circuitry 316 in device 302 or in the surrounding environment, e.g., cellular, WiFi, Bluetooth, NFC, or RFID. The RF energy can generate an electrical current in RF harvesting antenna 1200 that is communicated to voltage regulator 1112 and power management IC 1202 and used to power components of dormant BT tag 206. More particularly, a switch, e.g., a double pole-single throw switch 1212, can be used to connect the power management IC 1202 to the Bluetooth (BT) IC 1214 in the active state. The default position of switch 1212 is open, and as shown, when the switch is in the open position the switch does not transfer electrical energy from the power management IC 1202 to the BT IC 1214, resulting in the BT tag 206 being in the dormant state.

The voltage regulator 1112 can have a voltage output at the common collector that powers several tag components used to monitor a timer circuit, and to switch BT tag 206 to the active state when the timer expiration signal is detected. More particularly, the voltage regulator 1112 and power management IC 1202 can power an activation timer-control circuit 1206 when BT tag 206 is in the dormant state.

In an aspect, dormant BT tag 206 includes a timer-control circuit 1206 which is responsible for both the count-down timer function and the activation circuit functions. After voltage regulator 1112 and power management IC 1202 have received adequate RF energy/voltage, and storage capacitor 1204 has been adequately charged, power management IC 1202 enables timer-control circuit 1206 to then begin decrementing the preset count-down timer. The duration of the count-down timer can be preset at the time dormant BT tag 206 is manufactured. Upon expiration of the count-down timer the activation circuit verifies that the voltage status signal from power management IC 1202 is true before executing the two control functions that enable BT IC 1214 to transmit BT beacon data packets. The first activation function carried out by the control logic circuit can be to assert the control line to close double pole-single throw (DPST) switch 1212, to allow voltage to be applied to the BT IC 1214. Following the voltage being applied to BT IC 1214, the second activation function carried out by the control logic circuit is the assertion of the enable line going to the BT IC 1214. Upon assertion of the enable line, BT IC 1214 powers on and begins executing boot-code and then automatically transmits beacon data packets using BT antenna 1216. The transmitted beacon data packets are received by the BT radio 350 and in turn are passed on to the PCV test application 314. After transmitting the first set of BT beacon data packets to BT radio 350, BT IC 1214 continues to transmit beacon data packets until timer/control circuit 1206 de-asserts the control line to DPST switch 1212. The timer-control circuit continues to monitor the decreasing voltage of RC circuit 1208 for a voltage low threshold (VLT). Upon reaching the VLT, the timer-control circuit 1206 disables the BT IC 1214 by de-asserting the enable line and then opens DPST switch 1212 by de-asserting the control line.

In an aspect, a power management IC 1202 can communicate with timer/control circuit 1206. Communication between the timer/control circuit 1206 and the power management IC 1202 can be two-way communication such that communication signals pass both ways between the tag components. For example, power management IC 1202 and timer-control circuit 1206 can both be reset through a mutual reset sequence each time BT tag 206 transitions from the active state to the dormant state. Additionally, when power management IC 1202 detects storage capacitor 1204 has reached a voltage level that exceeds a predetermined $V_{min}$ (minimum operational voltage) the power management IC 1202 can activate the enable control line to allow the timer-control circuit 1206 to power on. Furthermore, the power management IC 1202 can output a voltage status signal that must be true when the count-down timer expires for the timer-control circuit 1206 to be assured that there is enough electrical power available to successfully wake the dormant BT IC 1214 and effect the successful transmission of BT beacon data packets. If the count-down timer expires and the voltage status signal is false, the timer-control circuit 1206 logic can reset the count-down timer and begin a new count-down sequence. Additionally, after the BT beacon data packet transmission has been completed and the voltage of the RC circuit 1208 has decreased to the VLT, timer-control circuit 1206 can de-assert the enable line to the BT IC 1214 and then de-assert the control line to open DPST switch 1212 to disconnect power from the BT IC 1214. Furthermore, with the voltage of RC circuit 1208 reaching VLT (voltage low threshold) the timer-control circuit 1206 can send a reset signal to the power management IC 1202, as described below.

The timer-control circuit 1206 can start a count-down timer function in response to receiving the enable signal from the power management IC 1202. Additionally, the timer-control functions can include actuating the DPST switch 1212 to connect the voltage outputs to a BT integrated circuit (IC). More particularly, timer-control circuit 1206 can alter a signal on the control line to DPST switch 1212 to cause the switch to move (physically or electronically) to a closed position (not shown). At the closed position, the switch contacts connect the voltage outputs of a power management IC 1202 to the power input pins on a BT IC 1214. The switch may include one or more transistors as switches to connect a power management IC 1202 to a BT IC 1214. When the switch is moved to the BT IC contacts and the enable line is activated, BT tag 206 is in the active state. Accordingly, in the active state the power management IC 1202 can power and/or communicate voltage to the BT IC 1214.

When the timer-control circuit 1206 is enabled, and the count-down timer expires, and the voltage status signal is true, the circuit can actuate the control line to DPST switch 1212 to connect the power management IC 1202 to the BT IC 1214. After actuating the switch to connect the power management IC 1202 to the BT IC 1214 the circuit can assert the enable line allowing BT IC 1214 to become active. When the enable line is asserted, the BT IC can be active and can transmit BT beacon data packets to a BT radio 350. More particularly, BT reader 350 can receive the BT beacon data packets and forward the packets to PCV test application 314, for example, to perform a third level verification by reading an identifier from the dormant BT tag 206. BT IC 1214 of BT tag 206 is programmed such that after power up BT IC 1214 automatically transmits beacon packets containing the contents of a tag memory to BT radio 350. For example, BT IC 1214 can send the identifier and/or other information stored in the tag memory to BT radio 350 via BT tag antenna 1216.

In an aspect, the timer/control circuit can be connected to ground through an analog circuit, e.g., an RC circuit 1208, having a decay rate. For example, a voltage value of the RC circuit can have an exponential decay that decreases from the voltage of the common collector when the DPST switch 1212 is in an open position to a lower threshold voltage within a decay period, e.g., within 1-2 seconds, when the DPST switch 1212 is in the closed position. The decay period represents a period within which BT radio 350 can receive a unique identifier and/or beacon data packets from BT IC 1214. More particularly, the active state of BT tag 206 may last for the decay period, while the timer/control circuit by design reserves sufficient energy to control the switch to move back to the open position to put BT tag 206 into the dormant state and allow the voltage regulator 1112 and power management IC to resume harvesting RF energy and charging storage capacitor 1204. The lower threshold voltage can correspond to the minimum energy required to de-assert the control line to DPST switch 1212. And thus, the active state can occur between the time when the enable signal to BT IC 1214 is asserted until the time when the control signal to DPST switch 1212 is de-asserted. By contrast, the dormant state can occur during the time between when the control signal to DPST switch 1212 is de-asserted until the time when the enable signal to BT IC 1214 is asserted.

During the active state, BT radio 350 can receive the BT tag data, e.g., operation 608. The received information can then be used by the one or more processors of the device-case system, e.g., operation 610. The BT beacon data packet transmission stops after all data packets have been transmitted. After transmitting the first set of BT beacon data packets to BT radio 350, BT IC 1214 continues to transmit beacon data packets until timer/control circuit 1206 de-asserts the control line to DPST switch 1212. Similarly, the BT beacon data packet transmission may end in response to the switch being reset to the open position when the timer/control circuit voltage drops to the voltage low threshold. In either case, if the BT beacon data packet transmission was unsuccessful, device 302 will be required to wait until the count-down timer expires again and another set of BT beacon data packets are transmitted to obtain the relevant data from BT IC 1214.

In an aspect, the power management IC 1202 and timer-control circuit 1206 can both be reset through a mutual reset sequence each time BT tag 206 transitions from the active state to the dormant state. When the timer-control circuit observes the RC circuit voltage has dropped below the VLT, the timer-control circuit 1206 can issue a reset signal to the power management IC 1202. As a result, the power management IC 1202 can be reset to a default power-on state. As described above, the initial default state of the power management IC 1202 on power up requires that the timer-control circuit 1206 be held in reset until the power management IC confirms the voltage level on the storage capacitor 1208 is stable and exceeds the $V_{min}$ (minimum operational voltage). As such, each time BT tag 206 transitions from the active state to the dormant state the power management IC 1202 and the timer-control circuit 1206 are both reset to their default power-on states through a mutual reset sequence.

When the RC circuit voltage reaches the predetermined voltage low threshold value, the timer/control circuit can de-asserted the control line of DPST switch 1212 to disconnect the power management IC 1202 from the BT IC 1214 to thus allow the voltage regulator 1112 and power management IC 1202 to resume harvesting RF energy to recharge storage capacitor 1204. BT tag 206 can then be in the dormant state. In the dormant state, the BT IC 1214 is prevented from continuously transmitting BT beacon data packets that would negatively affect BT bandwidth on device 302 needed for other BT applications. Additionally, preventing frequent BT beacon data packets also increases the available bandwidth of device processor 306 by removing the need to process a continuous stream of BT beacon data packets for PCV test application 314. Furthermore, in the dormant state, without the load of the BT IC 1214, the voltage regulator 1112 and power management IC 1202 become more efficient at harvesting and storing RF energy thus improving the chance the power management IC 1202 will be displaying a voltage status true signal to the timer-control circuit 1206 the next time the count-down timer expires and the timer-control circuit attempts to activate BT IC 1214 to transmit BT beacon data packets to BT radio 350.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A device, comprising:
   one or more sensors configured to generate a test output signal in response to an impact; and
   one or more processors configured to determine whether a protective case is mounted on the device based on the test output signal.

2. The device of claim 1, wherein the one or more sensors include an accelerometer.

3. The device of claim 1, wherein the one or more sensors include a microphone.

4. The device of claim 1, wherein the one or more processors are configured to determine whether the impact is from a drop event, and wherein determining whether the protective case is mounted on the device is in response to determining that the impact is from the drop event.

5. The device of claim 1, wherein the one or more processors are configured to determine one or more of impact force data or impact orientation data based on the test output signal.

6. The device of claim 5, wherein the one or more processors are configured to determine whether the protective case is mounted on the device based on a comparison of one or more of the impact force data or the impact orientation data to predetermined impact data.

7. The device of claim 6, wherein the predetermined impact data represents impacts experienced by other device-case systems.

8. A method comprising:
   generating, by one or more sensors of a device, a test output signal in response to an impact; and
   determining, by one or more processors, whether a protective case is mounted on the device based on the test output signal.

9. The method of claim 8, wherein the one or more sensors include an accelerometer.

10. The method of claim 8, wherein the one or more sensors include a microphone.

11. The method of claim 8, wherein the one or more processors are configured to determine whether the impact is from a drop event, and wherein determining whether the protective case is mounted on the device is in response to determining that the impact is from the drop event.

12. The method of claim 8, wherein the one or more processors are configured to determine one or more of impact force data or impact orientation data based on the test output signal.

13. The method of claim 12, wherein the one or more processors are configured to determine whether the protective case is mounted on the device based on a comparison of one or more of the impact force data or the impact orientation data to predetermined impact data.

14. The method of claim 13, wherein the predetermined impact data represents impacts experienced by other device-case systems.

15. A non-transitory machine readable medium storing instructions executable by one or more processors of a device to cause the device to perform a method comprising:
    receiving a test output signal in response to an impact; and
    determining whether a protective case is mounted on the device based on the test output signal.

16. The non-transitory machine readable medium of claim 15, wherein the test output signal is received from one or more sensors, and wherein the one or more sensors include one or more of an accelerometer or a microphone.

17. The non-transitory machine readable medium of claim 15, wherein the one or more processors are configured to determine whether the impact is from a drop event, and wherein determining whether the protective case is mounted on the device is in response to determining that the impact is from the drop event.

18. The non-transitory machine readable medium of claim 15, wherein the one or more processors are configured to determine one or more of impact force data or impact orientation data based on the test output signal.

19. The non-transitory machine readable medium of claim 18, wherein the one or more processors are configured to determine whether the protective case is mounted on the device based on a comparison of one or more of the impact force data or the impact orientation data to predetermined impact data.

20. The non-transitory machine readable medium of claim 19, wherein the predetermined impact data represents impacts experienced by other device-case systems.

* * * * *